(12) United States Patent
Yolles

(10) Patent No.: US 7,987,133 B2
(45) Date of Patent: *Jul. 26, 2011

(54) METHOD AND SYSTEM FOR INSURING AGAINST INVESTMENT LOSS

(75) Inventor: Brian Yolles, Carmel, IN (US)

(73) Assignee: StockShield, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/800,348

(22) Filed: May 13, 2010

(65) Prior Publication Data

US 2010/0228575 A1 Sep. 9, 2010

Related U.S. Application Data

(62) Division of application No. 10/074,659, filed on Feb. 12, 2002, now Pat. No. 7,720,736.

(60) Provisional application No. 60/288,669, filed on May 4, 2001, provisional application No. 60/299,084, filed on Jun. 18, 2001.

(51) Int. Cl.
*G06Q 40/00* (2006.01)

(52) U.S. Cl. ............ 705/36 R; 705/35; 705/37; 709/203

(58) Field of Classification Search ................ 705/4, 35, 705/36 R, 37; 709/201, 203
See application file for complete search history.

(56) References Cited

U.S. PATENT DOCUMENTS

| | | | |
|---|---|---|---|
| 5,126,936 A * | 6/1992 | Champion et al. | .......... 705/36 R |
| 5,704,045 A | 12/1997 | King et al. | |
| 5,752,236 A | 5/1998 | Sexton et al. | |
| 5,864,685 A | 1/1999 | Hagan | |
| 5,884,274 A | 3/1999 | Walker et al. | |
| 5,966,700 A | 10/1999 | Gould et al. | |
| 5,970,479 A | 10/1999 | Shepherd | |
| 5,974,390 A | 10/1999 | Ross | |
| 6,049,772 A | 4/2000 | Payne et al. | |
| 6,064,985 A | 5/2000 | Anderson | |
| 6,113,493 A | 9/2000 | Walker et al. | |
| 6,119,093 A | 9/2000 | Walker et al. | |
| 6,128,598 A | 10/2000 | Walker et al. | |
| 6,134,536 A | 10/2000 | Shepherd | |
| 6,360,210 B1 | 3/2002 | Wallman | |
| 2002/0040307 A1 | 4/2002 | Roscoe et al. | |
| 2002/0069155 A1* | 6/2002 | Nafeh et al. | .................. 705/37 |
| 2002/0087447 A1 | 7/2002 | McDonald et al. | |

(Continued)

OTHER PUBLICATIONS

Young, Peter C. et al. Government Risk-Financing Pools: An Assessment of Current Practices. Public Budgeting & Finance. Spring 1995. vol. 15 Issue 1, p. 96-112, 17p, 5 charts. US.*

(Continued)

*Primary Examiner* — Olabode Akintola
*Assistant Examiner* — Muriel Tinkler
(74) *Attorney, Agent, or Firm* — Vedder Price P.C.

(57) ABSTRACT

Participants purchase into a given system for a given period of time. Those with investment gains, by definition, are without loss and need no compensation from the system. Those with investment losses are reimbursed by the system according to previously agreed upon terms. Total loss of a given system's participants is calculated, with that figure compared to the previously agreed upon amount of funds available for loss compensation (total revenue generated by participant premiums minus previously agreed upon detracted percentage for firm or a sum set forward by the company that is independent of a given system's generated revenue).

30 Claims, 11 Drawing Sheets

U.S. PATENT DOCUMENTS

2002/0103852 A1* 8/2002 Pushka .................. 709/203
2002/0147670 A1* 10/2002 Lange ..................... 705/35

OTHER PUBLICATIONS

Patrice Poncet, & Victor E Vaugirard. (2001). The valuation of nature-linked bonds with exchange rate risk. Journal of Economics and Finance. 2001. 25(3), 293-307. Retrieved Dec. 3, 2009, from ABI/Inform Global. (Document ID: 98217061).*
Young, Peter C. et al. Government Risk-Financing Pools: An Assessment of Current Practices. Public Budgeting & Finance. Spring 1995. vol. 15 Issue 1, p. 96-112, 17p, 5 charts. US.
Patrice Poncet, & Victor E. Vaugirard. (2001). The valuation of nature-linked bonds with exchange rate risk. Journal of Economics and Finance. 2001. 25(3), 293-307. Retrieved Dec. 3, 2009, from ABI/Inform Global. (Document ID: 98217061).
J. Lange & N. Economides, A Parimutuel Market Microstructure for Contingent Claims, Aug. 2003.
K. Baron & J. Lange, Parimutuel Applications in Finance, 2007.
B.G. Malkiel, A Random Walk Down Wall Street, 1999.
Racing is Fun, Autotote Enterprises, Inc., Date Unknown.
Options Glossary, Definitions, Date Unknown.
California, Energy Commission, Definitions, Date Unknown.
PCT Search Report PCT/US02/12878, Mar. 31, 2003.
U.S. Appl. No. 10/074,659 Office Action dated May 29, 2007.
U.S. Appl. No. 10/074,659 Response dated Aug. 23, 2007.
U.S. Appl. No. 10/074,659 Office Action dated Nov. 2, 2007.
U.S. Appl. No. 10/074,659 Response dated Jan. 31, 2008.
U.S. Appl. No. 10/074,659 Office Action dated Mar. 21, 2008.
U.S. Appl. No. 10/074,659 Response dated Aug. 21, 2008.
U.S. Appl. No. 10/074,659 Interview Summary dated Sep. 3, 2008.
U.S. Appl. No. 10/074,659 Office Action dated Nov. 25, 2008.
U.S. Appl. No. 10/074,659 Interview Summary dated Mar. 5, 2009.
U.S. Appl. No. 10/074,659 Response dated Mar. 6, 2009.
U.S. Appl. No. 10/074,659 Office Action dated May 27, 2009.
U.S. Appl. No. 10/074,659 Response dated Aug. 5, 2009.
U.S. Appl. No. 10/074,659 Interview Summary dated Aug. 17, 2009.
U.S. Appl. No. 10/074,659 Interview Summary dated Dec. 7, 2009.
U.S. Appl. No. 10/074,659 Notice of Allowance dated Mar. 1, 2010.
U.S. Appl. No. 11/724,972 Office Action dated Sep. 19, 2008.
U.S. Appl. No. 11/724,972 Response dated Mar. 6, 2009.
U.S. Appl. No. 11/724,972 Office Action dated Jul. 8, 2009.
U.S. Appl. No. 11/724,972 Response dated Jul. 7, 2010.
U.S. Appl. No. 11/724,972 Supplemental Response dated Mar. 26, 2010.
U.S. Appl. No. 11/724,972 Notice of Allowance dated Apr. 8, 2010.

* cited by examiner

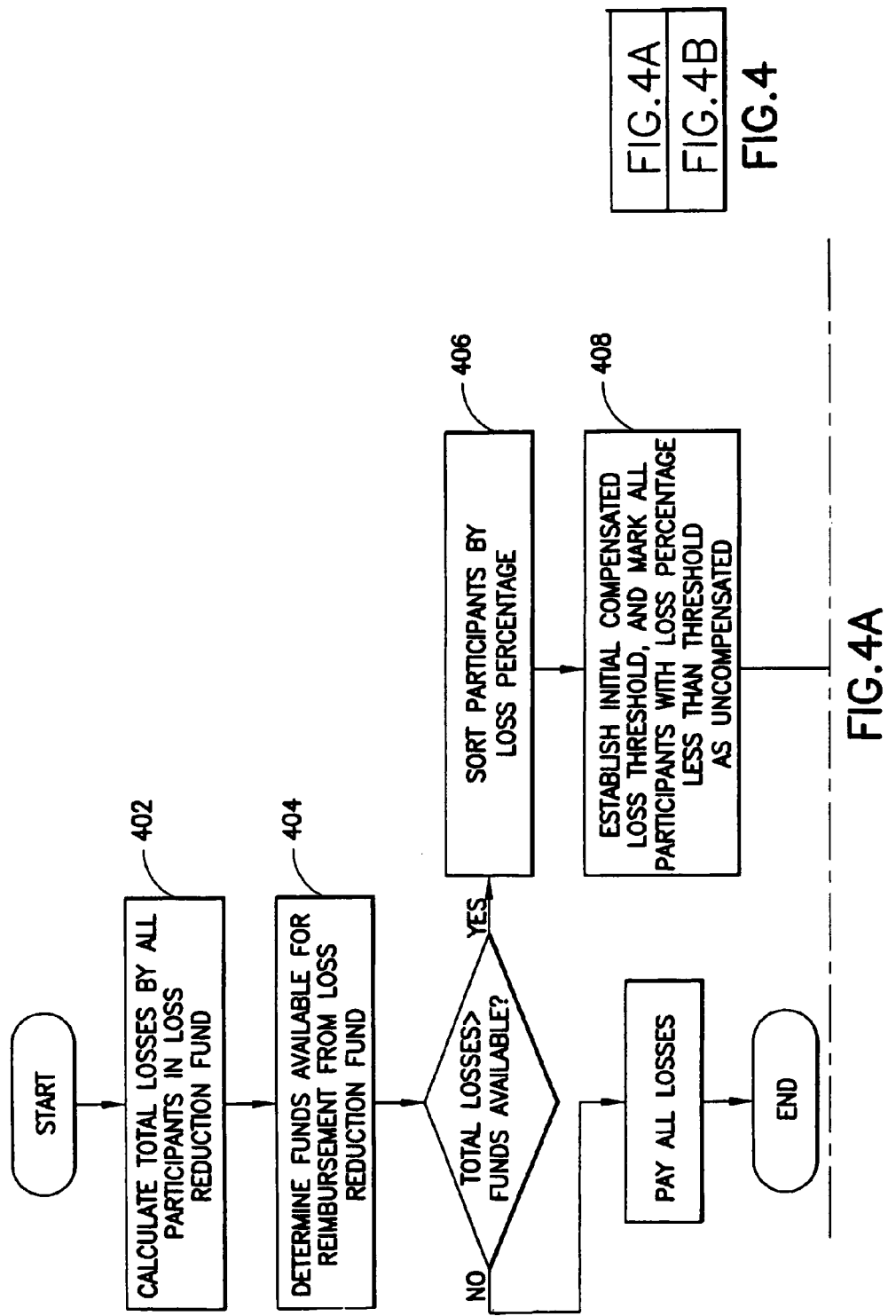

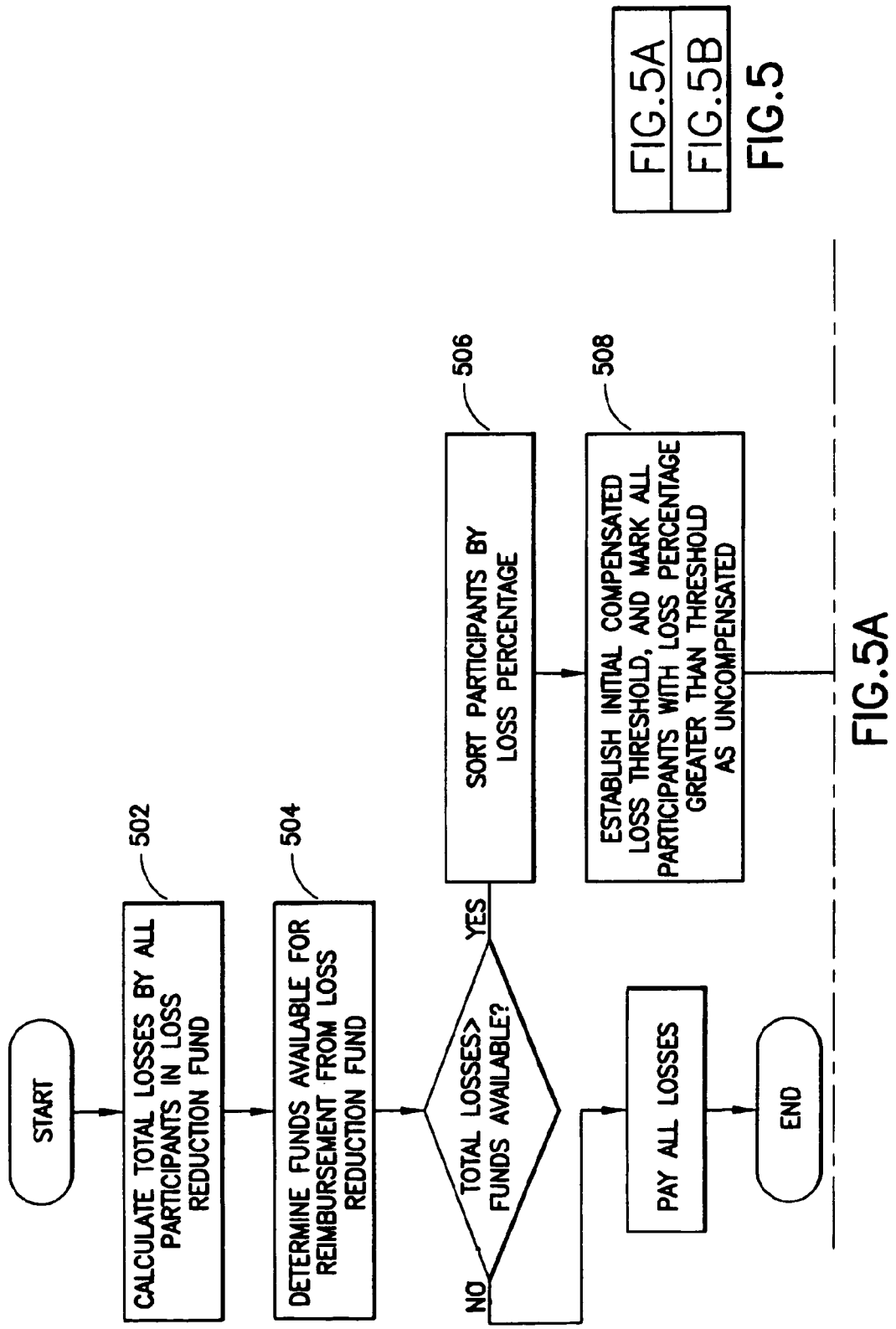

US 7,987,133 B2

METHOD AND SYSTEM FOR INSURING AGAINST INVESTMENT LOSS

This application is a divisional of U.S. patent application Ser. No. 10/074,659, which is scheduled to issue on May 18, 2010 as U.S. Pat. No. 7,720,736. This application claims the benefit of U.S. patent application Ser. No. 11/724,972, filed on Mar. 16, 2007 in the name of Brian Yolles and entitled "Method and system for Insuring Against Investment Loss", and U.S. patent application Ser. No. 10/074,659, filed on Feb. 12, 2002, in the name of Brian Yolles and entitled "Method and system for Insuring Against Investment Loss", and Provisional Patent Applications Ser. Nos. 60/288,669, filed on May 4, 2001 and 60/299,084, filed on Jun. 18, 2001 both in the name of Brian Yolles and entitled "Investment Insurance Instrument And The Systems And Methods Of Potential Means Of Operation And Distribution", all of which are incorporated herein by reference.

BACKGROUND

1. Field of the Invention

The invention relates to investment instruments and more particularly to a method and system for creating and using a loss reduction fund to compensate investors with investment losses.

2. Description of the Related Art

There are known insurance systems to compensate for various losses. There are also various techniques for controlling investment losses, such as through puts and calls. However, there is no technique or product that can be used by investors to spread risk of investment loss across a group of investors, thereby offsetting or reducing investment losses.

What is needed is a method and system to spread or allocate investment risk over a number of investors, to provide reductions in investment risk in return for payment of a premium.

The preceding description and citation of the foregoing documents is not to be construed as an admission that any of the description or documents are prior art relative to the present invention.

SUMMARY OF THE INVENTION

In one aspect, the invention is a system and method for sharing risk of loss among a plurality of investment instrument holders. The method and system comprise aggregating premiums to form a loss reduction fund, where the premiums are at least partially contributed by the plurality of holders. The method and system also comprise determining losses incurred by the plurality of holders at a predetermined time, and reimbursing at least a portion of the losses incurred by the plurality of investment instrument holders. Reimbursement to a particular investment instrument holder is at least partially determined by the loss of the particular investment instrument holder, with consideration for losses of the plurality of investment instrument holders.

In another aspect, the invention is a system and method for creating a loss reduction fund. The method and system comprise defining an investment category for the fund and associating a plurality of investment instruments with the investment category. The method and system further comprises calculating premiums for each investment instrument, where the premiums are held by the fund and at least partially used to reimburse losses of the investment instruments.

In another aspect, the invention is a system and method for allocating funds from a loss reduction fund. The method and system comprise determining respective losses of a plurality of investment instruments and determining funds available in the loss reduction fund. The method and system further comprises calculating a loss threshold and allocating funds from the loss reduction fund according to the threshold.

The foregoing specific objects and advantages of the invention are illustrative of those which can be achieved by the present invention and are not intended to be exhaustive or limiting of the possible advantages that can be realized. Thus, the objects and advantages of this invention will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

The instant invention allows an investor to participate in a fund providing reimbursement for losses incurred over specific terms or periods of time. In one embodiment, losses greater than a threshold level (e.g., a percentage) are reimbursed from the fund and losses less than the threshold level are absorbed by the individual investor. In another embodiment, losses less than a threshold level (e.g., a percentage) are reimbursed from the fund and losses greater than the threshold level are absorbed by the individual investor. In another embodiment, losses of the investor are reimbursed by another investor in return for an interest in future earnings or growth of the losing investor's portfolio. These and other embodiments are explained in greater detail below.

The various combination of these embodiments have the ability to significantly limit investor losses.

System

Figure 1:
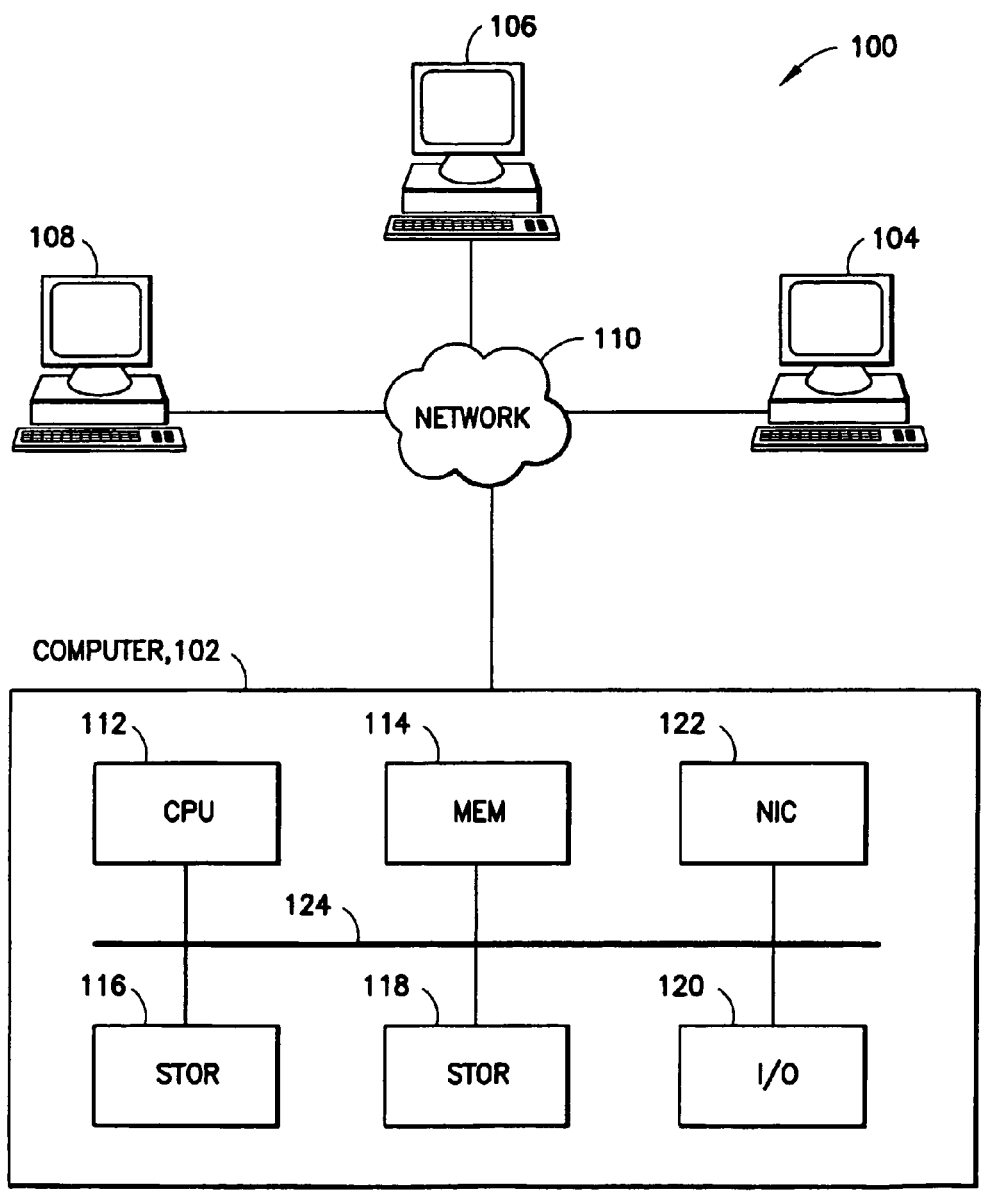
FIG. 1 illustrates an embodiment of a system according to the invention.

Referring to FIG. 1, one embodiment of a system 100 according to the invention includes a plurality of computers 102, 104, 106, 108, which are interconnected by network 110. Network 110 is a wired or wireless local area network or wide area network. In one embodiment network 110 is the Internet. Each of computers 102, 104, 106, 108 include a processor 112, memory 114, fixed code storage 116, removable code storage 118, input/output 120 and network interface 122, all of which are interconnected by bus 124. Network interface 122 connects computers 102, 104, 106, 108 to network 110.

General Illustration

Suppose participants in the method and system of the instant invention suffer losses totaling $10 million, with a previously agreed upon sum of loss compensation at $6 million. To compensate participants for sustained losses, the invention triggers a loss threshold mechanism whereby the system designates a given percentage or dollar amount that represents an amount of loss sustained by all system participants with a loss. For example, suppose there are 10 institutional participants in a system who have losses totaling $10 million, with each institution investing $5 million:

| | | |
|---|---|---|
| Participant A | Loss $1,000,000 | (20 percent of investment) |
| Participant B | Loss $1,500,000 | (30 percent of investment) |
| Participant C | Gain: amount irrelevant | |
| Participant D | Loss $500,000 | (10 percent of investment) |
| Participant E | Gain: amount irrelevant | |
| Participant F | Loss $1,000,000 | (20 percent of investment) |
| Participant G | Loss $2,000,000 | (40 percent of investment) |
| Participant H | Loss $250,000 | (5 percent of investment) |
| Participant I | Loss $100,000 | (2 percent of investment) |
| Participant J | Loss $3,650,000 | (73 percent of investment) |

Suppose the previously agreed upon sum of distributable loss compensation is $6 million. If participants indeed suffered $10 million in losses and the system can compensate $6 million of these losses, this therefore means that $4 million of sustained losses must remain losses. The allotment for loss compensation is made via the loss threshold mechanism.

Loss Threshold Mechanism

Eight of ten institutional participants in the previous system sustain losses, with an average loss of $1.25 million (25 percent of investment). One embodiment of the loss threshold mechanism of the invention works by assigning a percentage or amount of loss to each of these eight Participants With Losses (PWL). This figure applies to all PWL unless the figure is greater than a given participant's loss. In other words, Participant I, who lost 2 percent of its investment, receives no compensation if indeed all PWL must sustain a loss of 10 percent according to the loss threshold mechanism.

The loss threshold mechanism functions first by adding up all minor losses sustained by PWL. In the above example, a minor loss is one equal to or less than $500,000 (10 percent of investment). Hence the loss threshold mechanism first concludes that three of the eight PWL sustained minor losses. These minor losses total $850,000, or 21.25 percent of the $4 million figure representing the amount of sustained losses that must remain losses. As a result, the system distributes loss across the remaining five PWL in such a way that they together sustain $3,150,000 in total losses.

The system divides $3,150,000 by five, the number of remaining PWL. This yields the figure of $630,000, which represents the amount of loss which each remaining PWL must sustain, i.e., all PWL will have their losses limited to $630,000, or 12.6 percent of each investment. Participants D, H, and I—each of whom who did not sustain losses greater than $630,000 (i.e., suffered minor losses)—will receive no compensation for their losses. However, those five PWL who lost greater than $630,000 will be reimbursed for all funds lost beyond $630,000. In this simplified example, all of the investors have the same amount of investment, therefore allocation of a uniform percentage of loss is simple. However, it is very unlikely that all investor make the same investment. Therefore, determining a uniform percent of loss may be somewhat more complex, as discussed in greater detail below.

Hence loss compensation distribution is as follows:

| | | |
|---|---|---|
| Participant A | Loss $1,000,000 compensated $370,000 total loss limited to 12.6% | (20 percent of investment) |
| Participant B | Loss $1,500,000 compensated $870,000 total loss limited to 12.6% | (30 percent of investment) |
| Participant F | Loss $1,000,000 compensated $370,000 total loss limited to 12.6% | (20 percent of investment) |
| Participant G | Loss $2,000,000 compensated $1,370,000 total loss limited to 12.6% | (40 percent of investment) |
| Participant J | Loss $3,650,000 compensated $3,020,000 total loss limited to 12.6% | (73 percent of investment) |

Figure 2:
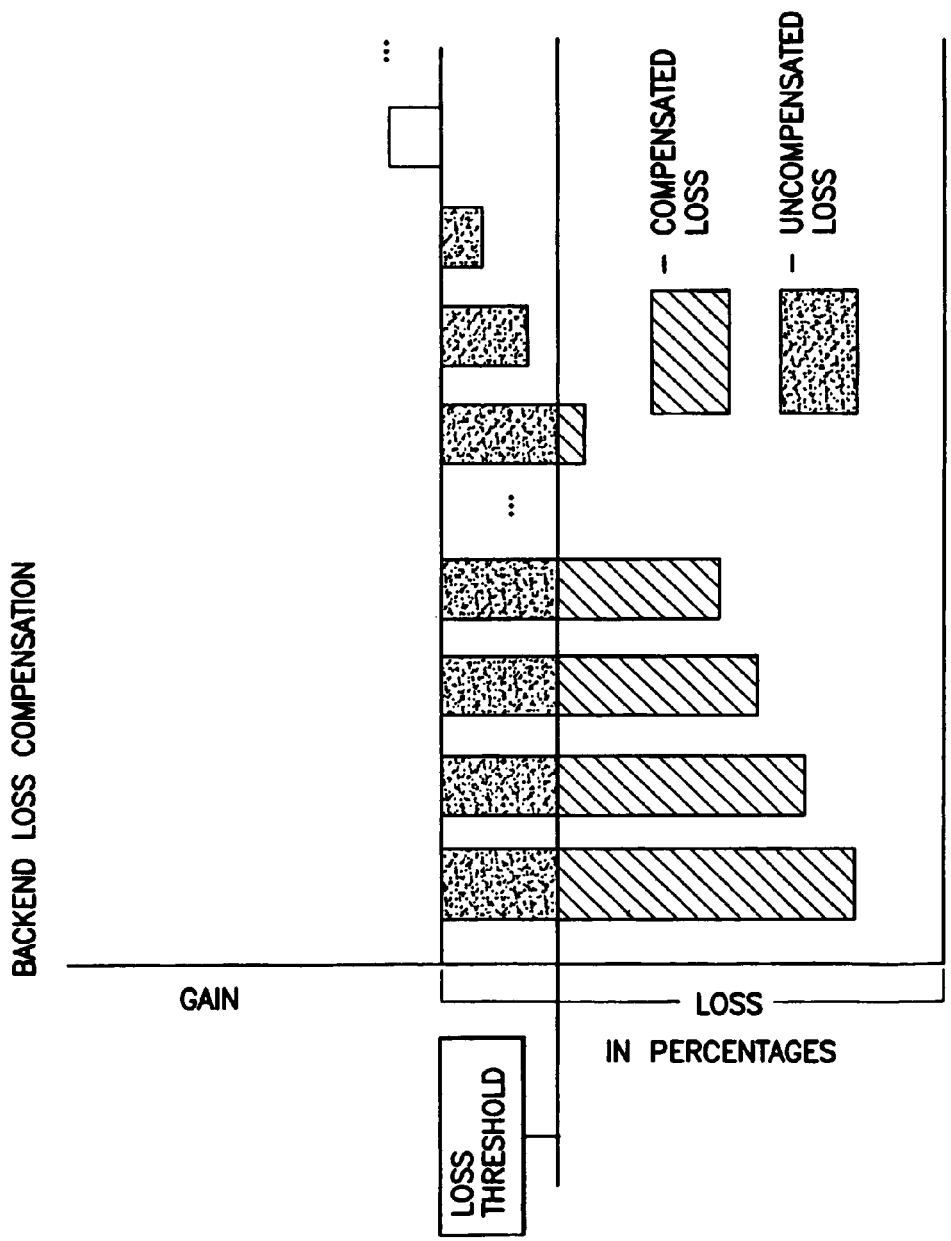
FIG. 2 illustrates an embodiment of loss compensation according to the invention.

Referring to FIG. 2, examples of the compensated and uncompensated losses of each security are illustrated.

Each participant to the system benefits in some fashion. First and foremost, the invention provides a guaranteed limit for all participants on their potential losses, depending on the amount of loss sustained by other participants. Participant J represents perhaps the most satisfied system participant, for the system reduces his or her 73 percent loss to 12.6 percent.

In this fashion, this system and method functions on ground similar to that of insurance corporations, compensating those who suffer the greatest amounts of damage. However, the method and system of the invention does not currently exist, most likely due to concern of a "bear" market. The system and method presented here, however, is profitable in any market, for under this method loss compensation is limited, and therefore allows for a revenue plan that is greater than the loss compensation. Hence the loss threshold mechanism serves to meet any and all market conditions.

Calculating the Loss Threshold

In the previous example, the 12.6 percent loss threshold represents the percentage which serves to demarcate the PWL into two categories: those who receive loss compensation and those who do not. In other words, those PWL with losses less than 12.6 percent sustain those losses, while PWL with losses greater than 12.6 percent are reimbursed for all loss sustained beyond this level.

An apparatus or method which calculates this percentage represents part of the invention. Indeed it is this scalable figure which serve to insulate market downfalls.

A more detailed example that demonstrates the means of calculating a given system's loss threshold is provided below.

Revenue Generation

The previous example also makes evident the significant role of a previously agreed upon sum of money which can represent the amount of distributable loss compensation funds. In this example, the figure of $6 million represented this figure.

Two possible sources exist for these compensation funds. First, a company practicing the invention can function as a subsidiary of a large corporation and draw easily from corporate funds to set forward this sum and then work to ensure that revenue exceeds any given sum so as to guarantee a profit.

Second, a company practicing the invention can establish a scheduling system whereby the company agrees to "insure" a given number of shares of a given security on a given date for a given period of time. For example, the company would agree to insure, for each trading day, 100,000 shares of each security listed in the Dow Jones Industrial Average index for a time period of six months.

As part of this method and system, the company would charge a premium that correlates with the total transaction value, minus commission and S.E.C. fee, of a stock purchase. For example, for a $10,000 transaction, the cost for participation in the system could be set at 3 percent, or $300.

Figure 3:
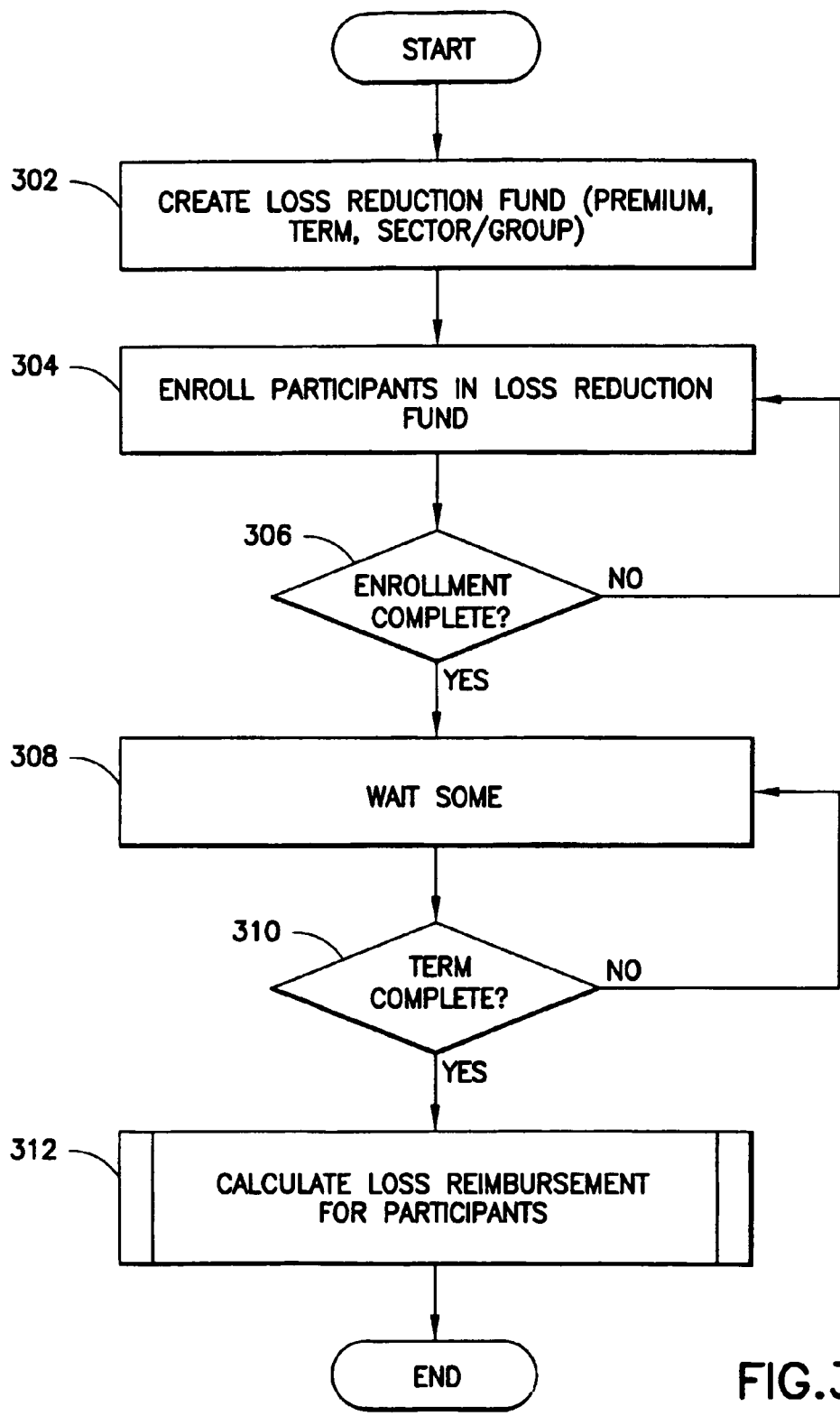
FIG. 3 illustrates an embodiment of a method according to the invention.

Referring to FIG. 3, an embodiment for creating the loss reimbursement fund starts at step 302 by selecting a group or sector of securities, a premium and a term.

At step 304, 306, investors enroll in the fund, and at steps 308, 310, system 100 waits until the term is reached.

At step 312, system 100 calculates the loss reimbursement threshold and amoung for the participating investors.

Means of Division

In order to ensure the lowest possible loss threshold figure and thereby allow for the greatest number of compensated PWL clients, a company practicing the invention may employ several strategies. For example, the company may group clients with like investments: by sector, by beta, or any number of other criteria. The company may group investments by purchase price categories (e.g., all investors whose policies indicate a purchase of between $40 and $41). The company also could group investors by trading day or hour, by index or average equity volume or dollar amount invested.

There may be many different "security class" systems to enable the company to ensure the lowest possible loss threshold and thereby allow for the greatest number of compensated PWL clients (and hence the highest degree of client satisfaction). The grouping strategies will likely differ according to market conditions.

In one embodiment, a company practicing the invention focuses on clients with long-term horizons who seek to purchase "blue chip" companies. In this embodiment, the company uses a scheduling system for the purchasing of policies (so as to enable the creation of "security classes," and hence avoid overexposure to any one security), the company may also target investors who utilize a dollar-cost averaging method of portfolio management. Regardless of the focus, the desire for investment "peace of mind" is significant given the burgeoning numbers of investors who are now relying upon the securities markets for their retirement and children's educations.

The method and system may also work as part of the company web site or as part of financial service firm trading screens.

Another Example

In this example, a company practicing the invention begins protecting client transactions in DJIA securities beginning Nov. 1, 2000, with coverage through Mar. 30, 2001 (approximately a five-month time frame). It is assumed here that the company utilized a scheduling system and insured 100,000 shares of each DJIA security for each trading day.

The closing prices for each Dow security on Nov. 1, 2000, and Mar. 30, 2001, respectively (Source: Commodity Systems, Inc., accessed via Yahoo! Historical Quotes), are as follows:

| Security | Nov. 1, 2001 closing | Mar. 30, 2001 closing |
| --- | --- | --- |
| Alcoa Inc. | $29.0625 | $35.9500 |
| American Express Company | $58.3750 | $41.3000 |
| AT&T Corp. | $22.0000 | $21.3000 |
| Boeing Co. | $65.7500 | $55.7100 |

-continued

| Security | Nov. 1, 2001 closing | Mar. 30, 2001 closing |
| --- | --- | --- |
| Caterpillar Inc. | $34.7500 | $44.3800 |
| Citigroup Inc. | $51.6870 | $44.9800 |
| Coca-Cola Co. | $60.8750 | $45.1600 |
| Disney (Walt) Co. | $36.6250 | $28.6000 |
| DuPont (E.I.) de Nemours & Co. | $43.9375 | $40.7000 |
| Eastman Kodak Co. | $60.8750 | $45.1600 |
| Exxon Mobil Corp. | $92.0625 | $81.0000 |
| General Electric Company | $54.4375 | $41.8600 |
| General Motors Corp. | $61.3750 | $51.8500 |
| Hewlett-Packard Co. | $44.4375 | $31.2700 |
| Home Depot Inc. | $44.0625 | $43.1000 |
| Honeywell International Inc. | $53.5000 | $40.8000 |
| Intel Corp. | $44.8750 | $26.3125 |
| International Business Machines Corp. | $98.5625 | $96.1800 |
| International Paper Co. | $36.0625 | $36.0800 |
| Johnson & Johnson | $91.0000 | $87.4700 |
| McDonald's Corp. | $31.6250 | $26.5500 |
| Merck & Co., Inc. | $89.7500 | $75.9000 |
| Microsoft Corp. | $69.6250 | $54.6875 |
| Minnesota Mining & Manufacturing Company | $95.1250 | $103.900 |
| JP Morgan Chase & Co. | $45.6875 | $44.9000 |
| Philip Morris Companies Inc. | $36.5620 | $47.4500 |
| Procter & Gamble Co. | $69.0000 | $62.6000 |
| SBC Communications Inc. | $56.0625 | $44.6300 |
| United Technologies Corp. | $68.6250 | $73.3000 |
| Wal-Mart Stores Inc. | $46.6875 | $50.5000 |

Figure 4B:
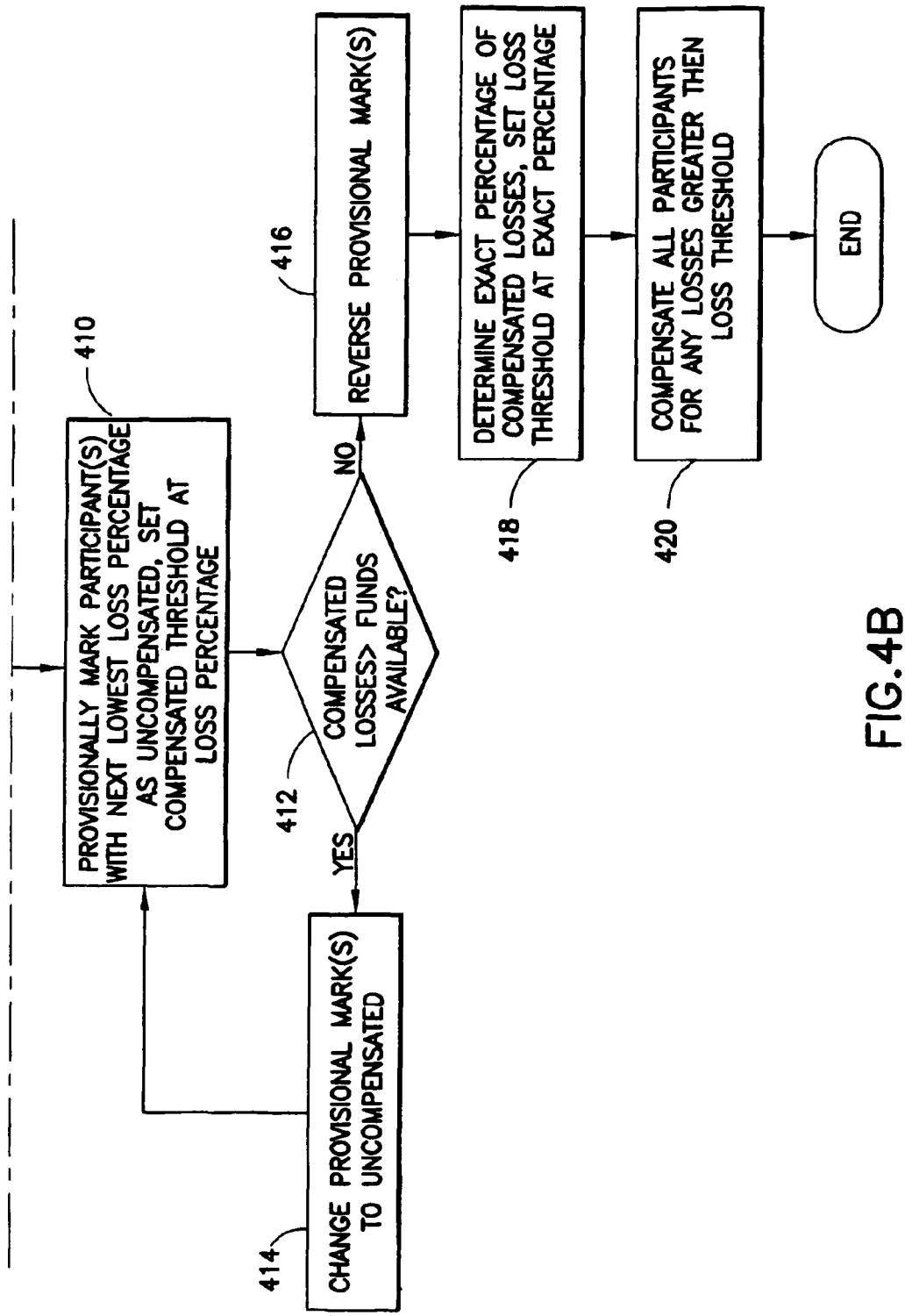
FIG. 4 illustrates an embodiment of a method according to the invention.

Referring to FIG. 4, the steps for calculating a loss threshold are illustrated.

1. Calculate transaction value of each security class.

A "security class" signifies here a specific product category. For example, if a company practicing the invention were to insure 100,000 shares of each security that comprise the Dow Jones Industrial Average, one "security class" could represent the firm's 100,000-share insurance of Citigroup or Alcoa.

Although a company practicing the invention may establish a premium utilizing several strategies, the example included here determines premiums at the rate of three percent of transaction values. The calculation of transaction value of any given security class is performed by multiplying the purchase price of the shares of a given class by the numbers of shares insured (100,000 shares in this example).

2. Calculate premium totals (i.e., revenue) for each security class.

Example: If $69.6250 represents the purchase price for the security class of Microsoft (MSFT) and a company practicing the invention insures 100,000 MSFT shares each trading day, of the 6-month term, the premium total for the Microsoft security class is $208,875 (transaction value: $6,962,500, with three percent of this figure yielding company revenue of $208,875).

3. Calculate total revenue for a given system.

Total premiums for each security class in the system (e.g., securities in the Dow) (total revenue is $5,032,125)

4. Using the revenues, calculate an appropriate loss compensation fund figure (step 402).

The "loss compensation fund figure" denotes the sum of money that a company practicing the invention distributes to clients who sustain qualified losses.

In the example included here, the total revenue is $5,032,125 and the loss compensation fund figure is set at $5,000,000.

This is a variable step and is typically established at the beginning of a coverage term. For example, due to a scheduling system, a company practicing the invention is able to reliably anticipate future revenues and thereby calculate an appropriate loss compensation fund for a given system in advance.

5. Get "end share price" information.

"End share price" may represent the sale price of the security or the 4 p.m. closing value at the end of the covered term.

For the example included here, the "end share prices" represent the closing trade values of Mar. 30, 2001, which represents an approximately five-month time period following purchases on Nov. 1, 2000.

6. Calculate the percentage losses or gains for each security class.

Example: with the purchase price for the Intel security class $44.88 and the "end share price" $26.31, the system determines that 41.36 percent of the investment was lost (i.e., $18.56 per share) over the term of coverage.

In one embodiment, the system and method also includes a means to allow clients to monitor the statuses of their insured products. If one security class shows a sizable loss but other securities have minor losses or gains, it is probable that the client will receive significant compensation from the system to cover much of the sustained loss.

NOTE: This method may also likely entail caps on loss, ensuring that no one security can drain the resources of a given security class. Caps are discussed in greater detail below.

7. At step 402, system 100 calculates the total amount of loss dollars sustained by the system's clients. This is done by calculating the amount of loss dollars for each security class and adding these figures together.

Example: In the example included here, the figure $20,375,000 represents the total amount of loss dollars sustained by all clients who purchased into the system on Nov. 1, 2000, and remained covered by their policies through Mar. 30, 2001.

8. Order the security classes according to their percentages of loss (step 406).

The example included here lists the security class showing the greatest gain at the bottom and the security class with the greatest loss at the top.

Each appreciated security class is designated by the word "GAIN."

Because these appreciated security classes do not need compensation from the system, they are automatically eliminated as candidates for compensation and thus designated as such by the word "ELIMINATED."

9. Using the total amount of loss dollars, calculate the total number of loss dollars which the system must eliminate as unqualified for compensation according to previously-agreed upon contract terms.

This calculation depends upon the figure representing the "appropriate loss compensation fund figure." If the loss compensation fund is set at $5,000,000 and client losses total $20,375,000, the system must eliminate as unqualified a total of $15,375,000.

10. Using the unqualified losses, the system and method eliminates as unqualified the amount of sustained loss dollars according to contract terms (steps 408-420).

In one embodiment, this entails an elimination utilizing a loss threshold percentage applied to all participants of a given system. If a security class suffers a loss greater than the loss threshold percentage, a portion of the sustained loss will be marked as qualified for compensation; the portion of loss that is sustained below the loss threshold percentage is marked as unqualified.

In the example included here, the system must mark a total of $15,375,000 loss dollars as unqualified. In one embodiment, the system and method begins with the security class showing the lowest percentage loss. In this case, J.P. Morgan Chase represents this security class, sustaining a 1.72 percent loss. The system proceeds by eliminating as unqualified this loss. The number of loss dollars sustained as part of this 1.72 percent decline ($78,750) are registered separately and applied against the $15,375,000 figure representing the number of dollars which the firm must mark as unqualified.

Significantly, as previously explained, the system also calculates the amount of unqualified dollars which a 1.72 percent loss yields when applied to all other security classes with losses that are part of the given system. In other words, if the loss sustained by clients who purchased into the J.P. Morgan Chase security class represents the only security class which the system must eliminate, then all other clients with losses would deduct 1.72 percent from their sustained loss percentage to ensure equitable treatment of all clients with losses. If, however, such an applied percentage deduction yields a figure that is greater than the amount of loss dollars needing to be marked unqualified, the system proceeds to Step Eleven and thereby utilizes a formula to calculate a percentage applied to all security classes within a given system.

In the example included here, the system necessitates 14 calculations to determine that the loss threshold lies between 15.519 percent and 16.047 percent. The first thirteen of these calculations are denoted "ELIMINATED-1," "ELIMINATED-2," "ELIMINATED-3," "ELIMINATED-4," "ELIMINATED-5," "ELIMINATED-6," "ELIMINATED-7," "ELIMINATED-8," "ELIMINATED-9," "ELIMINATED-10," "ELIMINATED-11," "ELIMINATED-12," and "ELIMINATED-13." The fourteenth calculation, which informed the system that the marking of all losses sustained by clients of the McDonald's security class should not be eliminated and are hence not entirely unqualified, is denoted "RESTORE-14/COMPENSATED." This means that the McDonald's loss percentage (16.047 percent) is greater than the system's loss threshold and therefore that the total loss-dollars associated with this security class should not be separately registered with the "wholly" eliminated security classes of the previous thirteen calculations (i.e., those with losses lower than the loss threshold).

This therefore also means that all security classes above McDonald's (i.e., those with loss percentages that are greater than the loss threshold) have portions of their loss that are qualified for compensation, namely the amount of dollars which represent the amount that causes the security class's loss percentage to reside above the system's loss threshold. As can be noted on the chart, all securities with loss percentages greater than that of McDonald's (16.047 percent) qualify for some amount of compensation.

11. Calculate the exact loss threshold of the system, which is between 15.519 percent and 16.047 percent.

Before proceeding to the formula, it is necessary to add up the total number of dollars eliminated as part of the "wholly" eliminated security classes (i.e., those that are separately registered).

For the example included here, it is evident that the wholly-eliminated security classes (those from J.P. Morgan Chase to General Motors) yield 7,448,250 loss-dollars which are marked unqualified. Because the system originally determined in Step Nine that the system must mark as unqualified 15,375,000 dollars, it is necessary to now subtract 7,448,250 from 15,375,000 to determine the number of dollars which remain to be marked as unqualified. This subtraction yields the figure of 7,926,750.

To calculate the system's loss threshold, the system utilizes here the following formula:

$x$(transaction value of security class $A$)+$x$(transaction value of security class $B$)+$x$(transaction value of security class $C$)=figure representing the number of dollars which remain to be marked as unqualified (in this case, 7,926,750)

The variable here, representing the system's loss threshold, is denoted by x.

The left side of the equation should comprise all security classes with losses that qualify for compensation.

Returning to the example provided here, the security classes from Intel to McDonald's should be represented:

$x$(transaction value Intel security class)+$x$(transaction value of Hewlett-Packard security class)+$x$(transaction value of American Express security class)+$x$(transaction value of Coca-Cola security class)+$x$(transaction value of Honeywell International security class)+$x$(transaction value of General Electric security class)+$x$(transaction value of Disney security class)+$x$(transaction value of Microsoft security class)+$x$(transaction value of SBC Communications security class)+$x$(transaction value of McDonald's security class)=7,926,750

This, in turn, yields:

$x$(4487500)+$x$(4443750)+$x$(5837500)+$x$(6087500)+$x$(5350000)+$x$(5443750)+$x$(3662500)+$x$(6962500)+$x$(5606250)+$x$(3162500)=7,926,750

This leads to the equations:

51,043,750x=7,926,750

$x$=7,926,750/51,043,750 x=0.155293253

Hence the loss threshold for this system is 15.5293253 percent, meaning that: All security classes with percentage losses above this threshold sustain a loss up to—but no greater than—this figure.

Hence the system ensures that all participants will not sustain losses greater than 15.5293253 percent.

Example:

If a client purchased 100 shares of Intel on Nov. 1, 2000, at $44.88 per share, held onto those shares through Mar. 30, 2001, and had purchased an insurance policy for approximately $134 on Nov. 1, 2000, the client would be compensated $1,159 by this system on Mar. 30, 2001. Uninsured, this client would have suffered a loss of 41.365 percent, or $1,857. Because he or she was insured, however, the client only suffers a loss that is limited to the system's threshold, which is 15.529 percent in this case.

Significantly, the system is presently imagined as distributing compensation to clients even if they do not sell their insured securities in the open market. This therefore may represent a significant value proposition for long-term investors.

Ideally, this system and method also includes the means by which these compensations are processed and delivered to clients.

Important note: As briefly noted earlier, the company practicing the invention can employ several strategies to reduce the average loss threshold and thereby increase client compensation. One strategy entails comprehensive and complex diversification. Security classes also may be formed on the basis of sector, index, share price, purchase date, security beta, or any number of factors.

Sample: How a Scheduling System Might Work

1. On March 27, a client decides he or she wants to purchase 100 shares of Intel. (INTC)
2. The client visits www.(company-name).com.
3. The client types in "INTC" and "100" (the number of shares desired) in the fields and clicks "submit."
4. In response, the client learns:

The earliest date available to purchase protection for INTC stock is:

Apr. 16, 2001.

Estimated cost of six-month policy coverage: $87.

If you would like to make this reservation, please proceed onto Step Five.

5. Enter credit card or account information.

Name and address.

6. The client is then instructed:

On Apr. 16, 2001, purchase 100 shares of INTC through your broker.

On Apr. 16, 2001, return to www.(company-name).com.

Enter the purchase price of your shares.

(The firm may seek client permission to verify purchase price with brokerage or request copies of the client's brokerage statement. The firm also may develop its own system whereby trade execution data for insured transactions are immediately and automatically processed.)

The client is further informed:

You will be billed 3 percent of the total value of this transaction, not including the commission of your broker.

(If you do not enter a purchase price, the company will assume your purchase occurred at the highest ask price of the day.)

[The company also may have a "select your premium" program with a range, for example, of between 1 and 5 percent of transaction values depending on the amount of the loss compensation fund desired by the client (and hence probability for compensation).]

7. The client is charged $87.
8. The client is then informed that he or she may sell his or her shares whenever he or she wishes. If the client sells for a gain (or small loss), the company may decide to reward this client with points applicable toward frequent flyer miles, hotel and other incentive programs. This provides the firm with promotional opportunities to persons "in the money."

If a client sells and suffers a significant loss, he or she may be compensated automatically via their brokerage account; provided with credit toward additional insurance/protection policies; mailed a check; and/or a variety of other possibilities.

Upon the sale of insured securities, the client visits www.(company-name).com and sign in. He or she will then see a screen showing the shares that are insured. The client is provided the opportunity to enter the "sale" price. If at the end of the policy's coverage period the client's sustained loss qualifies for compensation, the client's credit card or account will be credited.

Integration with Major Financial Services Firms

For several reasons it is in the best interest of financial services firms to integrate this system and method within their operations. The company would hope to become part of the trading screens of private client operations of financial service firms worldwide. Some of the benefits the invention provides to financial services firms include:

Trade volume increases given perceived decreases in risk

Commissions from the sales of policies

Prevention of developing the "disgruntled" client who loses significant quantities of money to the market, blames the broker, and transfers funds to a competing firm Scalability The system and method for the control or limitation of individual or institutional losses can be tailored to virtually any commodity or investment instrument that involves fluctuating market value, both in the United States and around the world. These include:

Futures and options exchanges;

Real estate markets (protecting land by region, city, or state, for example); and Bond markets.

Reverse-Oriented Loss Threshold Mechanism

Figure 5B:
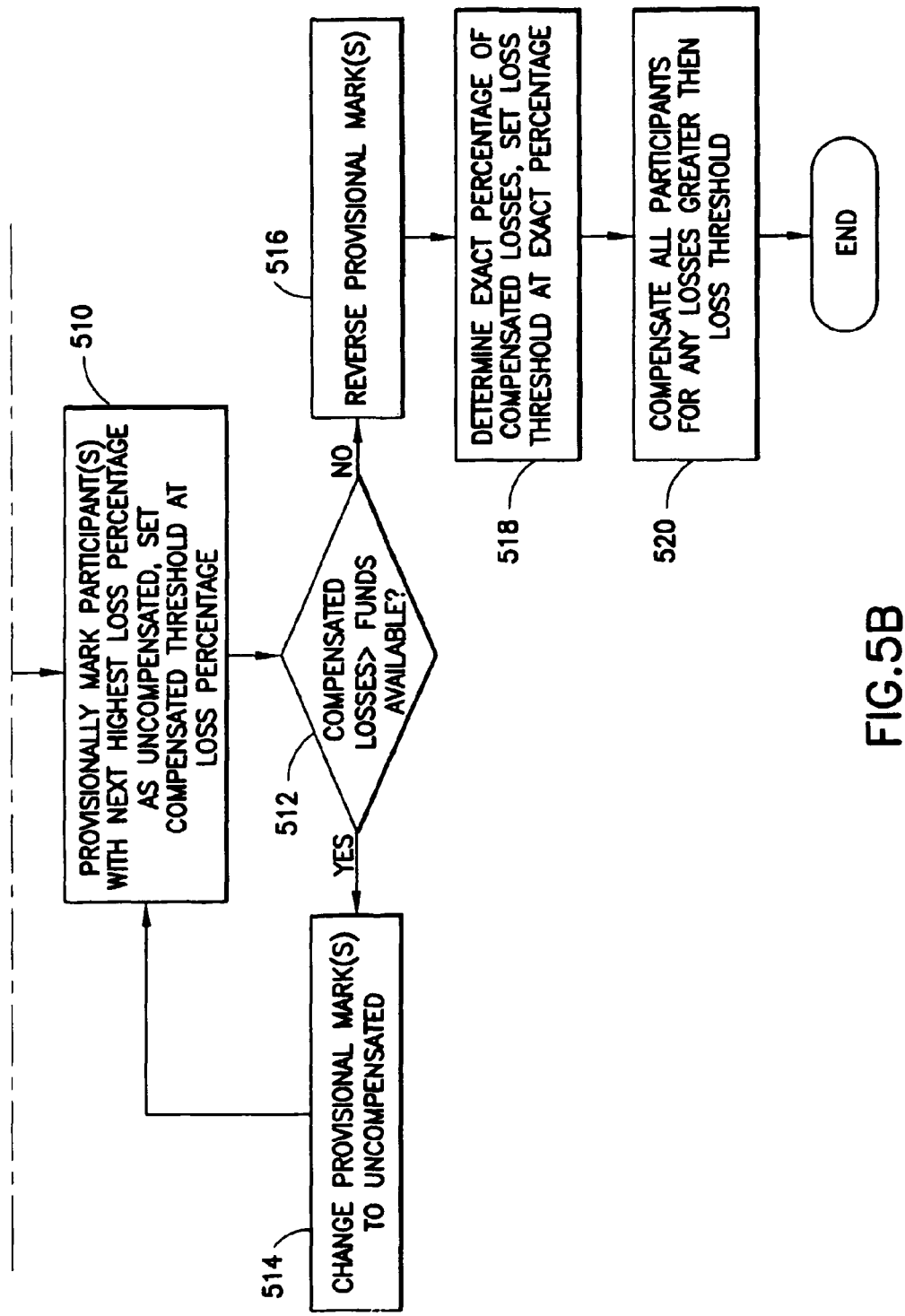
FIG. 5 illustrates an embodiment of a method according to the invention.

Referring to FIG. 5, an example of this embodiment is illustrated.

1. Calculate transaction value of each security class.

A "security class" signifies here a specific product category. For example, if a company practicing the invention were to insures 100,000 shares of each security that comprise the Dow Jones Industrial Average, one "security class" could represent the firm's 100,000-share insurance of Citigroup or Alcoa.

Although a company, practicing the invention may establish a premium utilizing several strategies, the example included here determines premiums at the rate of three percent of transaction values. The calculation of transaction value of any given security class is performed by multiplying the purchase price of the shares of a given class by the numbers of shares insured (100,000 shares in this example).

2. Calculate premium totals (i.e., revenue) for each security class.

Example: If $69.6250 represents the purchase price for the security class of Microsoft (MSFT) and a company, practicing the invention insures 100,000 MSFT shares each trading day of the 6 month term, the premium total for the Microsoft security class is $208,875 (transaction value: $6,962,500, with three percent of this figure yielding company revenue of $208,875).

3. Calculate total revenue for a given system.

Total premiums for each security class in the system (e.g., securities in the Dow). (Total revenue is $5,032,125)

4. Using the revenue, calculate an appropriate loss compensation fund figure.

The "loss compensation fund figure" denotes the sum of money that a company practicing the invention distributes to clients who sustain qualified losses (step 504).

In the example included here, the total revenue is $5,032,125 and the loss compensation fund figure is set at $5,000,000.

This is a variable step and is typically established at the beginning of a coverage term. For example, a company practicing the invention is able to reliably anticipate future revenues and thereby calculate an appropriate loss compensation fund for a given system in advance.

5. Get "end share price" information.

"End share price" may represent the sale price of the security or the 4 p.m. closing value at the end of the covered term.

For the example included in the previous papers, the "end share prices" represent the closing trade values of Mar. 30, 2001, which represents an approximately five-month time period following purchases on Nov. 1, 2000.

6. Calculate the percentage losses or gains for each security class.

Example: With the purchase price for the Intel security class $44.88 and the "end share price" $26.31, the system determines that 41.36 percent of the investment was lost (i.e., $18.56 per share) over the term of coverage.

In one embodiment, the system and method also includes a means to allow clients to monitor the statuses of their insured products. If one security class shows a sizable loss but other securities have minor losses or gains, it is probable that the client will receive significant compensation from the system to cover much of the sustained loss.

NOTE: This method may also likely entail caps on loss (discussed in greater detail below), ensuring that no one security can drain the resources of a given security class.

7. Calculate the total amount of loss dollars sustained by the system's clients. This is done by calculating the amount of loss dollars for each security class and adding these figures together (step 502).

Example: In the example included in previous papers, the figure $20,375,000 represents the total amount of loss dollars sustained by all clients who purchased into the system on Nov. 1, 2000, and remained covered by their policies through Mar. 30, 2001.

8. Order the security classes according to their percentages of loss (step 506).

The example included here lists the security class showing the greatest gain at the bottom and the security class with the greatest loss at the top.

Each appreciated security class is designated by the word "GAIN."

Because these appreciated security classes do not need compensation from the system, they are automatically eliminated as candidates for compensation and thus designated as such by the word "ELIMINATED."

9. Using the total amount of loss dollars, calculate the total number of loss dollars which the system must eliminate as unqualified for compensation according to previously-agreed upon contract terms (steps 508-520).

This calculation depends upon the figure representing the "appropriate loss compensation fund figure." If the loss compensation fund is set at $5,000,000 and client losses total $20,375,000, the system must eliminate as unqualified a total of $15,375,000.

10. Using the unqualified losses, the system and method eliminates as unqualified the amount of sustained loss dollars according to contract terms.

In one embodiment this entails an elimination utilizing a reversed loss threshold percentage applied to all participants of a given system. If a security class suffers a loss greater than the loss threshold percentage, that portion of the sustained loss will be marked as unqualified for compensation and be applied against the figure yielded by Step Nine; the portion of loss that is sustained below the loss threshold percentage is marked as qualified for compensation.

In the example above, the system must mark a total of 15,375,000 loss dollars as unqualified. Toward this end, the method described here begins with the security class showing the greatest percentage loss. In this case, Intel shareholders represent this security class, sustaining a 41.36 percent loss. The system proceeds by first eliminating the loss that separates the Intel security class from that of Hewlett-Packard, the security class sustaining the second-greatest loss. Hewlett-Packard shares declined 29.63 percent during this time period. The system subtracts 29.63 from 41.36, yielding 11.73. This latter figure represents the percentage amount that the system first eliminates as unqualified for compensation.

The number of loss dollars sustained as part of this 11.73 percent elimination (about $526,384) is registered separately and applied against the $15,375,000 figure representing the number of dollars which the firm must mark as unqualified.

The system then looks at the security class that presents the third greatest percentage loss. In this case, that security class is American Express, whose shares sustained a 29.25 percent decline. The system eliminates the loss percentage that separates the Hewlett-Packard security class from that of American Express. The system subtracts 29.25 from 29.63, yielding 0.38. This percentage amount is eliminated from the Hewlett-Packard total as well as the Intel percentage loss. This yields, respectively, $16,886 and $17,053 unqualified sustained loss dollars. These are, again, registered separately and applied against the $15,375,000 figure representing the number of dollars which the firm must mark as unqualified.

This process continues until too many sustained loss dollars are eliminated as unqualified. When this occurs, the system reverses one step and eliminates only the percentage amount needed to meet the $15,375,000 figure representing the number of dollars which the firm must mark as unqualified. Returning to the example, the system goes so far as to eliminate the loss percentage that separates the DuPont security class from that of Johnson & Johnson (subtracting as well the Johnson & Johnson loss percentage figure from all security classes with greater losses and applying the new unqualified dollar figures against the $15,345,000 figure) before realizing that this latter elimination yielded a total number of about $15,545,545 unqualified sustained loss dollars, a figure that is $170,545 too many. This therefore means that the reversed loss threshold is between 3.88 percent and 7.37 percent, (i.e., we need to mark as qualified $170,545 additional dollars).

11. To calculate the system's reversed loss threshold, the system utilizes here the following formula, where x represents the loss threshold percentage:

(Transaction value of security class $A$) (security class $A$ percentage loss in decimal form)−(Transaction value of security class $A$) $(x)$+(Transaction value of security class $B$) (security class $B$ percentage loss in decimal form)−(Transaction value of security class $A$) $(x)$+(Transaction value of security class $C$) (security class $C$ percentage loss in decimal form)−(Transaction value of security class $C$) $(x)$+[ . . . ]=Figure representing number of loss dollars that must be marked as unqualified The left side of the equation should comprise all security classes with partial losses that are among those marked as unqualified.

Returning to the example provided here, the security classes from Intel to DuPont should be represented:

(Transaction value of INTC security class)(INTC security class percentage loss in decimal form)−(Transaction value of INTC security class) $(x)$+(Transaction value of HWP security class)(HWP security class percentage loss in decimal form)−(Transaction value of HWP security class) $(x)$+(Transaction value of AXP security class)(AXP security class percentage loss in decimal form)−(Transaction value of AXP security class) $(x)$+(Transaction value of KO security class)(KO security class percentage loss in decimal form)−(Transaction value of KO security class) $(x)$+(Transaction value of HON security class)(HON security class percentage loss in decimal form)−(Transaction value of HON security class) $(x)$+(Transaction value of GE security class)(GE security class percentage loss in decimal form)−(Transaction value of GE security class) $(x)$+(Transaction value of DIS security class)(DIS security class percentage loss in decimal form)−(Transaction value of DIS security class) $(x)$+(Transaction value of MSFT security class)(MSFT security class percentage loss in decimal form)−(Transaction value of MSFT security class) $(x)$+(Transaction value of SBC security class)(SBC security class percentage loss in decimal form)−(Transaction value of SBC security class) $(x)$+(Transaction value of MCD security class)(MCD security class percentage loss in decimal form)−(Transaction value of MCD security class) $(x)$+(Transaction value of GM security class)(GM security class percentage loss in decimal form)−(Transaction value of GM security class) $(x)$+(Transaction value of MRK security class)(MRK security class percentage loss in decimal form)−(Transaction value of MRK security class) $(x)$+(Transaction value of BA security class)(BA security class percentage loss in decimal form)−(Transaction value of BA security class) $(x)$+(Transaction value of C security class)(C security class percentage loss in decimal form)−(Transaction value of C security class) $(x)$+(Transaction value of XOM security class)(XOM security class percentage loss in decimal form)−(Transaction value of XOM security class) $(x)$+(Transaction value of EK security class)(EK security class percentage loss in decimal form)−(Transaction value of EK security class) $(x)$+(Transaction value of PG security class)(PG security class percentage loss in decimal form)−(Transaction value of PG security class) $(x)$+(Transaction value of DD security class)(DD security class percentage loss in decimal form)−(Transaction value of DD security class) $(x)$=15,375,000

This, in turn, yields:

[(4487500)(0.4136)−(4487500)$x$]+[(4443750)(0.2963)−(4443750)$x$]+[(5837500)(0.2925)−(5837500)$x$]+[(6087500)(0.2582)−(6087500)$x$]+[(5350000)(0.2374)−(5350000)$x$]+[(5443750)(0.2310)−(5443750)$x$]+[(3662500)(0.2191)−(3662500)$x$]+[(6962500)(0.2145)−(6962500)$x$]+[(5606250)(0.2039)−(5606250)$x$]+[(3162500)(0.1605)−(3162500)$x$]+[(6137500)(0.1552)−(6137500)$x$]+[(8975000)(0.1543)−(8975000)$x$]+[(6575000)(0.1527)−(6575000)$x$]+[(5168750)(0.1298)−(5168750)$x$]+[(9206250)(0.1202)−(9206250)$x$]+[(4518750)(0.1172)−(4518750)$x$]+[(6900000)(0.0928)−(6900000)$x$]+[(4393750)(0.0737)−(4393750)$x$]=15,375,000

One step further:

[1856030−4487500$x$]+[1316683.125−4443750$x$]+[1707468.75−5837500$x$]+[1571792.50−6087500$x$]+[1270090−5350000$x$]+[1257506.25−5443750$x$]+[802453.75−3662500$x$]+[1493456.25−6962500$x$]+[1143114.375−5606250$x$]+[507581.25−3162500$x$]+[952540−6137500$x$]+[1384842.5−8975000$x$]+[1004002.5−6575000$x$]+[670903.75−5168750$x$]+[1106591.25−9206250$x$]+[529597.5−4518750$x$]+[640320−6900000$x$]+[323819.375−4393750$x$]=15,375,000

One more step:

[1856030−4487500$x$]+[1316683.125−4443750$x$]+[1707468.75−5837500$x$]+[1571792.50−6087500$x$]+[1270090−5350000$x$]+[1257506.25−5443750$x$]+[802453.75−3662500$x$]+[1493456.25−6962500$x$]+[1143114.375−5606250$x$]+[507581.25−3162500$x$]+[952540−6137500$x$]+[1384842.5−8975000$x$]+[1004002.5−6575000$x$]+[670903.75−5168750$x$]+[1106591.25−9206250$x$]+[529597.5−4518750$x$]+[640320−6900000$x$]+[323819.375−4393750$x$] 19538793.13−102918750$x$=15,375,000

This leads to the equations:

19538793.13−102918750$x$=15,375,000

102918750$x$=15,375,000−19538793.13

102918750$x$=−4163793.13 x=-4163793.13/-102918750 x=0.04045708999

Reversed Loss Threshold Percentage: 4.0457

Figure 6:
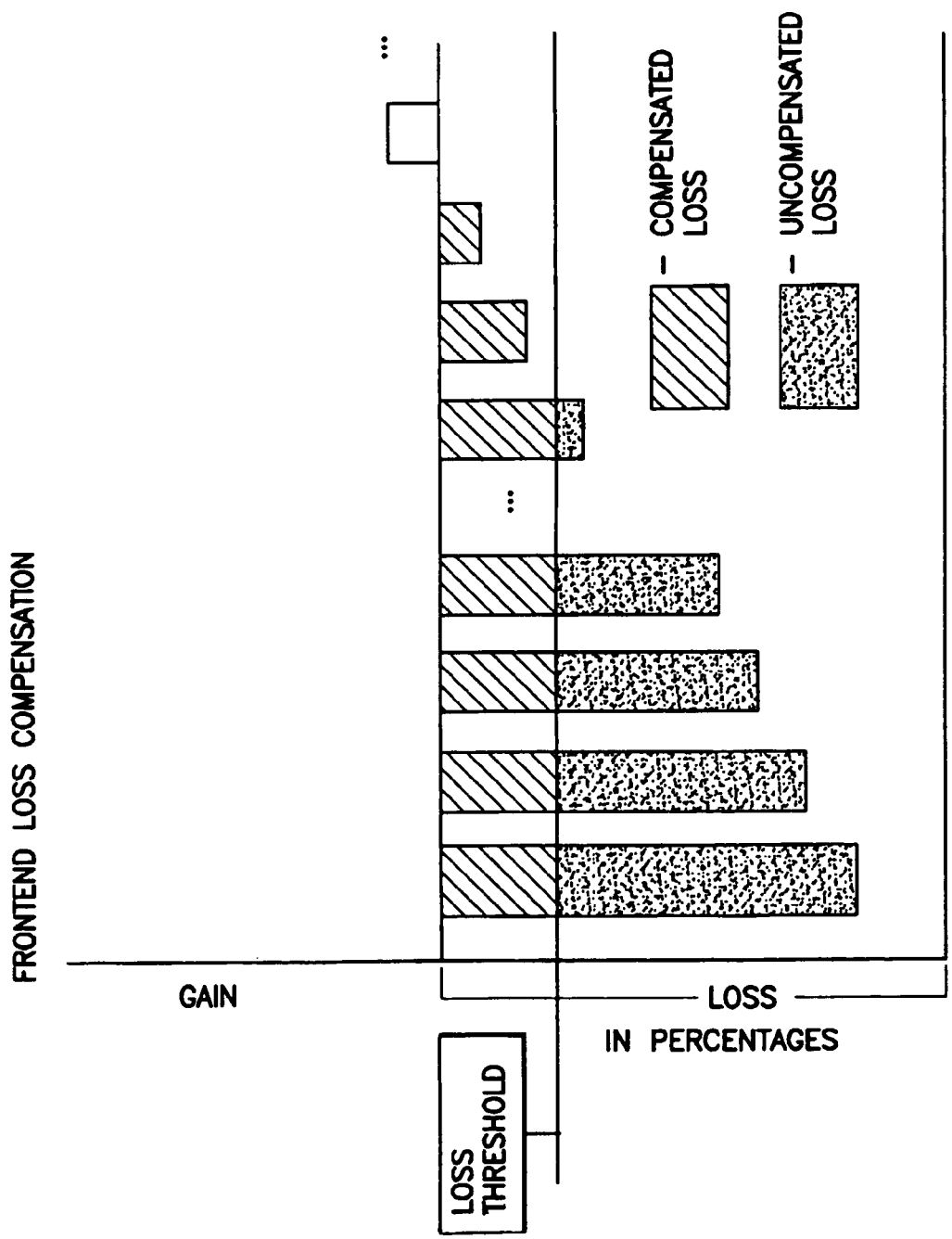
FIG. 6 illustrates an embodiment of loss compensation according to the invention.

Hence the reversed loss threshold for this system is 4.0457 percent, meaning that all losses below (or less than) this threshold are compensated. This is illustrated in FIG. 6.

When combined with what is identified here as forward-oriented insurance (i.e., the method detailed above) a considerable measure of downside protection is secured.

Example:

Let us suppose a client purchased 100 shares of Intel on Nov. 1, 2000, at $44.88 per share, the optimal price for his or her security class. Let us suppose that no cap exists on the amount of insurable loss and that he or she held onto these shares for a six-month time period, through Mar. 30, 2000, when the stock price closed at $26.31. Let us suppose as well that this client had purchased on Nov. 1, 2000, both forward-oriented and reverse-oriented insurance policies for an approximate premium of $268. Uninsured, this client would have suffered a loss of 41.365 percent, or $1,857. Because he or she was "doubly-insured," however, the client only suffered a loss of about 11.52 percent, excluding commissions and policy purchases. (He or she received about $181 from the reverse-oriented system—4.0457 percent of $4,488, the transaction value—and approximately $1,159 from the forward-oriented system.)

Including policy purchases, the client's loss would have stood, after compensation, at about 17.49 percent. This loss could have been reduced further had the client written a covered call on his or her shares, receiving that premium, and if he or she had sold the declining shares upon sustaining a 20 percent loss. For this reason, it is now recommended that this system operate with a cap of 20 percent on insurable loss. This provides clients with the motivation to monitor their investments and stem losses.

Cap on Reimbursement

Figure 7:
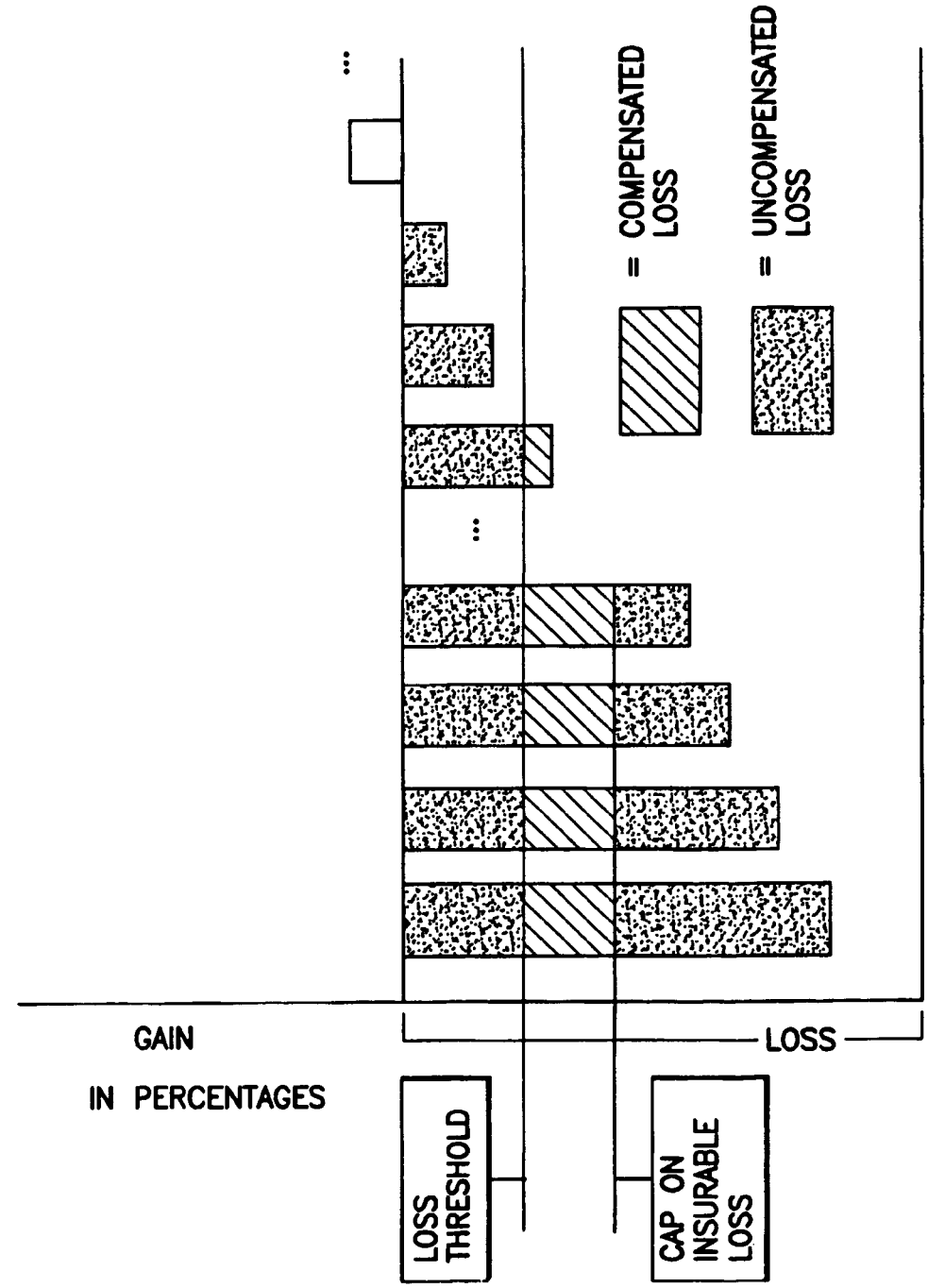
FIG. 7 illustrates an embodiment of loss compensation according to the invention.

In one embodiment, the system sets a cap on the amount of loss reimbursement. On example of a cap is illustrated in FIG. 7 Here, loss from zero to the loss threshold is uncompensated, and loss greater than the cap is uncompensated. However, loss that is greater than the loss threshold and less than the cap is compensated.

Security Class Formation on a Running Basis

The following explains another embodiment for transactions designated to occur on a running basis. This method eliminates the need for a system that utilizes a scheduling operation, but it is nevertheless possible that this method and that which utilizes a scheduling mechanism may work alongside each other.

In describing this embodiment, we will consider the pathway of one hypothetical equity transaction: one purchase on Feb. 1, 2000, of 3,000 shares of Winn-Dixie Stores (symbol WIN, NYSE) at the price of $19.50 per share.

Note on the Classification System utilized herein

This document utilizes the North American Industrial Classification System (NAICS), a method of classifying businesses that replaced Standard Industrial Classification in 1997.

According to the NAICS Association, the NAICS framework utilizes the following hierarchy:

Industry Sector
Industry Subsector
Industry Group
Industry

One embodiment adopts the first half of this hierarchy. That is, classification will occur on the basis of Industry Sector and Industry Subsector. In other embodiments, the method is extended to Industry Group and Industry.

Significantly, the NAICS divides economic activity into 20 sectors. The Manufacturing Sector, however, is too large for accurate equity diversification, comprising 21 subsectors. Therefore, it is preferable to divide the Manufacturing Sector into nine semi-related groups, each of which, for the purposes of this document's embodiment, will serve as its own sector:

1. Food Manufacturing
Beverage Manufacturing
2. Textile Mills
Textile Product Mills
Apparel Manufacturing
Leather and Allied Product Manufacturing
3. Wood Product Manufacturing
Paper Manufacturing
Furniture and Related Product Manufacturing
Printing and Related Support Activities
4. Petroleum and Coal Products Manufacturing
Nonmetallic Mineral Product Manufacturing
5. Plastics and Rubber Products Manufacturing
Chemical Manufacturing
Nonmetallic Mineral Product Manufacturing
6. Primary Metal Manufacturing
Fabricated Metal Product Manufacturing
Machinery Manufacturing
Transportation Equipment Manufacturing
7. Computer and Electronic Product Manufacturing
8. Electrical Equipment, Appliance, and Component Manufacturing
9. Miscellaneous Manufacturing Hence the description of the invention uses the NAICS, but divides economic activity into 28 sectors.

Security Class Formation on the Basis of Sector and Subsector

As part of one embodiment, it is important to first define the ways in which a security class is formed. As an example, two different levels of security classes are initially formed.

All incoming orders for equity insurance are funneled into categories according to:

their Sector [e.g. Retail Trade, Manufacturing, etc.]; and
their Subsector [e.g. Food and Beverage Stores within the Retail Trade sector, Chemical Manufacturing within the Manufacturing sector].

In one embodiment, for purposes of diversification, an insured equity transaction undergoes three different rounds of loss compensation: one based on the performance of the security's subsector (20 percent exposure); one oriented around, more generally, the security's sector (20 percent exposure); and one grounded in the performance of at least thirteen other sectors (60 percent), to provide general macroeconomic exposure that is beyond subsector and sector performance.

If we assume that a sector security class is formed at the moment when it comprises a security class for each subsector, then as soon as the sector security class is formed, the sector security class becomes closed, and the company begins to form a new security class for that given sector. For example, as soon as the Mining sector security class comprises security classes for each of its three subsectors—Oil and Gas Extraction; Mining (except Oil and Gas); and Support Activities for Mining—the security class for the Mining sector becomes closed to new participants.

Of course this suggests a need to define a subsector security class. If we assume that a subsector security class is formed at the moment when it generates a given amount of premiums, then as soon as this amount of revenue generation is achieved, the subsector security class becomes closed, and the company begins work on forming a new security class for that given subsector. It is also at this moment that the subsector security class joins the security class of its sector.

For example, as soon as those policies issued to cover shares of Oil and Gas Extraction companies reach a point of revenue generation in excess of $700,000, the Oil and Gas Extraction subsector's security class becomes closed to new participants. Subsequent requests for insurance for Oil and Gas Extraction subsector shares are funneled toward the creation of a new Oil and Gas Extraction subsector security class. The recently-closed subsector security class for Oil and Gas Extraction joins the security class of the Mining sector, which awaits other subsector security class formations.

As previously suggested, the Mining sector security class is formed when each of its three subsectors generate at least $700,000 in revenue. This does not mean, however, that the Mining security class has available a loss compensation fund of $2.1 million. As previously noted, for purposes of diversification, an insured equity transaction will undergo three different loss compensation processes in an effort to provide general macroeconomic exposure that is beyond subsector and sector performance. The premiums generated by each subsector will be divided according to these percentages.

Ensuring Diversification

Separately but relatedly, for the purposes of diversification, a company practicing the invention may establish a rule such that no security shall comprise a given subsector's security class to an extent greater than its market share within that subsector. In other words, if the Coca-Cola Company controls 50 percent of the Beverage Manufacturing subsector (of the Manufacturing sector), then insurance for Coca-Cola stock cannot exceed 50 percent of the Beverage Manufacturing subsector. Ideally, however, a company practicing the invention could create a rule such that no one stock can comprise more than about 30 percent of any given subsector security class, ensuring considerable diversification.

The bottom line is that a subsector security class should approximate the financial hierarchy of that subsector without compromising diversification. This assumes, of course, that demand for equity insurance correlates roughly with market capitalizations and/or market shares. If it does not, then perhaps an even more balanced form of diversification is possible. Ultimately, security class formation is designed to occur in a way that ensures that the principle of diversification remains intact.

Three Important Features of Subsector Security Class Formation:

INDIVIDUAL MATCHING. The very nature of security class formation allows for the development of an exciting and novel product feature: the matching of individual clients and their positions. In other words, a company practicing the invention is able to provide clients with non-identifying lists of other individual clients with positions in a given subsector or perhaps provide an interactive medium in which a client can monitor (but not impact) the performance of other individuals' positions within his or her transaction's subsector and sector. This potentially enjoyable form of monitoring the investments and price positions of others, without identifying information, represents a compelling product feature. A client may be interested in observing if other clients within a given subsector or sector class are liquidating their positions for profits or losses. A company practicing the invention can make this feature compelling also by creating or allowing for the formation of even smaller subsector and sector security classes with perhaps only a handful of clients in each.

RUNNING BASIS FORMATION. In one embodiment, due to the rules established to ensure diversification within subsector security classes, it may be necessary to have several different security classes for the same subsector simultaneously under formation. For example, suppose a company practicing the invention receives an order to insure 100,000 shares of grocer Foodarama Supermarkets (symbol FSM, AMEX) at the price of $21 per share. With a market capitalization of approximately $25 million, the company is decidedly small, and the transaction is decidedly unusual representing almost 10 percent of the market capitalization. The mandate for diversification dictates its placement not within one Food and Beverage Stores subsector security class but rather several classes, across what may be a long period of time. Hence the company may have numerous security classes for the same subsector under formation at the same time. In the hypothetical case of the Foodarama transaction, a company practicing the invention, could establish ten different security classes for the Food and Beverage Stores subsector and place 10,000 shares of the 100,000 share transaction into each.

OPTIMAL PRICE DETERMINATION. The principal obstacle to developing a system that utilizes a running basis method rested in the notion that few individuals would want to purchase into (i.e., join) a security class if he or she knew that most of the participants in that system already had losses on their positions, meaning that the loss threshold percentage may be more likely to be high. Clients would therefore time their purchases into various security classes following upturns in the security or sector. This is problematic from a number of perspectives. It was thus determined that the solution to (or avoidance of) this problem could take at least two forms:

In one embodiment, the invention forms security classes on hourly or daily bases, this provides all participants with similar entry points into their positions, and largely avoids the problem of clients timing their purchases to coincide only with rising markets or appreciated securities. However, this embodiment may also compromise the principle of diversification if the company's underwriting volume is low.

In another embodiment, the invention forms security classes over longer periods of time, and the entry points of positions are established not according to the actual (and varied) entry points of clients but rather the optimal (i.e., highest) entry point of all security class participants with positions in a given security. In other words, suppose a security class under formation includes two clients with insured positions in AOL Time Warner but different entry points: one person (Client A) purchased her stock at $56 per share on Monday while the other (Client B) purchased his stock at $54 on Tuesday. A method that utilizes optimal price determination would effectively erase the $54 entry point of Client B and subsume it with the higher, and hence more optimal (from a loss compensation perspective), entry point of Client A.

This benefits Client B because loss compensation allotment is then computed as though he entered the stock at $56 rather than $54. In other words, even though Client B may have suspected that other clients had actual losses on their investments due to the decline in AOL Time Warner's stock price from Monday to Tuesday, Client B had the incentive to join the system, knowing that he would not join a group of "losers" (risking a high loss threshold percentage) but instead receives the most optimal entry point. In receiving this optimal entry point for his transaction, Client B may ultimately receive an amount of loss compensation that is greater than his actual sustained loss (if indeed Client B has a loss at the end of his coverage period and the loss compensation fund is large enough to yield a very low loss threshold percentage).

This method therefore encourages clients to secure the lowest entry point with the hope that the optimal price determination mechanism will assign to AOL Time Warner shareholding clients a price higher than their actual entry point. This method would largely avoid the timing problem. Although some may say that the timing problem would reverse, with clients wanting "in" when stocks are on the decline, the converse is also very much possible: when stocks are on the rise, clients would want "in," locking in the present price, with the hope or expectation that the stock will continue to rise (providing a higher optimal price). Indeed, these are precisely the motivations that are involved with the assumption of most long positions in a security.

Another Example of Optimal Price Determination

Suppose a client purchases Cisco Systems on Monday at $20 per share. Suppose the stock declines to $18 on Tuesday. Rather than hesitating to join this security class that already includes a client with a paper loss, a different client on Tuesday decides without hesitation to join, guided by the expectation that Cisco will rise and that he or she is capable, through this association, of receiving as his or her optimal entry price at least $20. Indeed, according to this method, Cisco's subsector security class would assume as its common entry point for Cisco shareholders that price which is most optimal for clients; in this case, if the $20 transaction is the highest of all class participants with positions in Cisco, it represents the most optimal and would therefore become the security class's common entry point for Cisco shareholders. This method is included as part of the Winn-Dixie example, which is outlined below.

Significantly, a company practicing the invention may reveal different levels of information to prospective clients about the composition of security classes under formation. If it is determined that forthright revelations compel clients to join security classes, then certainly the company would strongly consider the continuation of such offers of information if indeed such offers do not violate client privacy and are equitable to all clients.

Dividends and a Dividend Reinvestment Program in Equity Insurance

For the sake of simplicity, none of the calculations here include dividends in determining loss compensation. However, because dividends often provide significant returns and because, in many cases, a stock is owned less for capital appreciation and more for its dividend. In one embodiment, the invention includes dividends in calculating loss compensation.

With this stated, however, a company practicing the invention may determine that many retail and institutional investors care very little about the dividends issued on their stocks and strongly prefer capital appreciation. In other words, a significant amount of distributed dividends could be funneled toward greater investor value and satisfaction if applied toward equity insurance—by the investor's company, on behalf of individual shareholders who opt for such dividend reinvestment and convenience. In this way, dividend reinvestment in equity insurance represents a reinvestment in their company. This type of equity insurance promotes price stability and appreciation, in addition to heightened investor confidence, through perceived decreases in risk.

In furthering these interests, a company practicing the invention may seek to institute a program through which public companies purchase insurance for their shareholders by utilizing shareholder dividends (with shareholder permission). Such a purchase would further the interests of public companies in the promotion of price stability, appreciation, and investor confidence.

The Winn-Dixie Example

It is now appropriate to see all of the aforementioned method in action and also add some information along the way. In doing so, as previously noted, we will focus on the hypothetical transaction of a purchase of 3,000 shares of Winn-Dixie Stores (symbol WIN, NYSE), purchased on Feb. 1, 2000, at the price of $19.50 per share. With a transaction value, excluding commissions, of $58,500. A three percent of transaction value premium of $1,755 insures this equity position for six months.

Upon receiving and processing this order, the policy is placed within the appropriate subsector and sector security classes under formation. Winn-Dixie is a part of the Food and Beverage Stores subsector of the Retail Trade sector.

Let us suppose that the Food and Beverage Stores subsector (below) started formation on Jan. 24, 2000. Let us suppose as well that the purchase of 3,000 shares of Winn-Dixie on Feb. 1, 2000, represented the transaction that pushed the subsector security class's revenue generation beyond $167,000, a level that completes and closes this security class to new participants. Let us then suppose that on Feb. 1, 2000, the Food and Beverage Stores subsector security class consisted of these (albeit exaggerated) transactions, listed by company and, beneath each company name, in chronological order:

(For purposes of diversification, let us say here that shares of the nation's largest grocer are not allowed to comprise more than half of the grocer subsector security class. Policy purchases beyond this limit are not problematic, however; our company would form another security class for the Food and Beverage Stores subsector and simultaneously form it alongside this security class.)

| The Kroger Company (symbol KR, NYSE) | | | | |
|---|---|---|---|---|
| # of shares | purchase date | price | trans value | premium |
| 10,000 | Jan. 24, 2000 | $16.3125 | $ 163,125 | $4,893,75 |
| 5,000 | Jan. 25, 2000 | $16.125 | $ 80,625 | $ 2,418.75 |
| 15,000 | Jan. 26, 2000 | $16.50 | $ 247,500 | $ 7,425 |
| 8,000 | Jan. 27, 2000 | $16.9375 | $ 135,500 | $ 4,065 |
| 30,000 | Jan. 28, 2000 | $16.5625 | $ 496,875 | $ 14,906.25 |
| 5,000 | Jan. 31, 2000 | $17.375 | $ 86,875 | $ 2,606.25 |
| 18,000 | Feb. 1, 2000 | $17.75 | $ 319,500 | $ 9,585 |
| Total | | | $1,530,000 | $ 45,900 |
| Optimal Price | | $17.75 | | |

| Albertson's Inc. (symbol ABS, NYSE). | | | | |
|---|---|---|---|---|
| # of shares | purchase date | price | trans value | premium |
| 5,000 | Jan. 24, 2000 | $30.75 | $ 153,750 | $ 4,612.50 |
| 25,000 | Jan. 26, 2000 | $30.4375 | $760,937,50 | $22,828,13 |
| 10,000 | Jan. 28, 2000 | $29.875 | $ 298,750 | $ 8962,50 |
| 5,000 | Feb. 1, 2000 | $30.1875 | $ 150,937.50 | $ 4528.13 |
| Total | | | $ 1,364,375 | $ 40,931.26 |
| Optimal Price | | | $ 30.75 | |

| Safeway Inc. (symbol SWY, NYSE) | | | | |
|---|---|---|---|---|
| # of shares | purchase date | price | trans value | premium |
| 10,000 | Jan. 25, 2000 | $31.875 | $ 318,750 | $ 9,562.50 |
| 2,000 | Jan. 27, 2000 | $35.75 | $ 71,500 | $ 2,145 |
| 18,000 | Feb. 1, 2000 | $39.00 | $ 702,000 | $21,060 |
| Total | | | $1,092,250 | $32,767.50 |
| Optimal Price | | $39.00 | | |

| Whole Foods Market (symbol WFM1, NASDAQ) | | | | |
|---|---|---|---|---|
| # of shares | purchase date | price | trans value | premium |
| 4,000 | Jan. 25, 2000 | $43.4375 | $173,750 | $ 5,212.50 |
| 1,000 | Jan. 27, 2000 | $44.375 | $ 44,375 | $ 1,331.25 |
| 8,000 | Feb. 1, 2000 | $46.25 | $370,000 | $11,100 |
| Total | | | $588,125 | $17,643.75 |
| Optimal Price | | $46.25 | | |

| The Great Atlantic Pacific Tea Company (symbol GAP, NYSE) | | | | |
|---|---|---|---|---|
| # of shares | purchase date | price | trans value | premium |
| 12,000 | Jan. 28, 2000 | $27.25 | $327,000 | $ 9,810 |
| 7,000 | Feb. 1, 2000 | $27.00 | $189,000 | $ 5,670 |
| Total | | | $516,000 | $15,480 |
| Optimal Price | | $27.25 | | |

| Marsh Supermarkets Class A (symbol MARSA, NASDAQ) | | | | |
|---|---|---|---|---|
| # of shares | purchase date | price | trans value | premium |
| 10,000 | Jan. 14, 2000 | $15.625 | $156,250 | $4,687.50 |
| 7,600 | Jan. 25, 2000 | $15.00 | $114,000 | $3,420 |
| 4,000 | Jan. 31, 2000 | $14.25 | $ 57,000 | $1,710 |
| Total | | | $327,250 | $9,817.50 |
| Optimal Price | | $15.625 | | |

| Arden Group (symbol ARDNA, NASDAQ) | | | | |
|---|---|---|---|---|
| # of shares | purchase date | price | trans value | premium |
| 3000 | Jan. 27, 2000 | $31.25 | $93,750 | $2,812.5 |
| Total | | | $93,750 | $2,812.5 |
| Optimal Price | | $31.25 | | |

| Winn-Dixie Stores (symbol WIN, NYSE) | | | | |
|---|---|---|---|---|
| # of shares | purchase date | price | trans value | premium |
| 1,000 | Jan. 26, 2000 | $20.875 | $20,875 | $ 626.25 |
| 3,000 | Feb. 1, 2000 | $19.50 | $58,500 | $1,755 |
| Total | | | $79,375 | $2,381.25 |
| Optimal Price | | $20.875 | | |

| Foodarama Supermarkets (symbol FSM, AMEX) | | | | |
|---|---|---|---|---|
| # of shares | purchase date | price | trans value | premium |
| 1000 | Jan. 26, 2000 | $21.00 | $21,000 | $630 |
| Total | | | | $630 |
| Optimal Price | | $21.00 | | |

According to this example, the purchase on Feb. 1 of insurance covering 3,000 shares of Winn-Dixie Stores pushed the revenue figure generated by the Food and Beverage Stores subsector security class beyond $167,000. Indeed, the revenue point prior to this purchase rested at $166,608.76 according to the figures above. The Winn-Dixie purchase, however, compelled a new revenue total for the subsector of $168,363.76. This effectively closed this Food and Beverage Stores subsector security class to new participants and impelled its binding to the encompassing retail sector security class under formation.

Flexibility in Sector Security Class

Like subsector security classes, a sector security class is defined here by its amount of generated revenue. Because each sector has a varying number of subsectors, the amount of generated revenue for each subsector security class differs according to the needs of the sector security class. Let us suppose an important rule here is that each sector security class should generate approximately $1 million in revenue. Hence the amount of generated revenue that defines each subsector security class depends on the needs of the sector security class. A sector security class is defined as a group of subsector security classes.

Significantly, a sector security class does not need to include a security class for each subsector. Because subsector security classes will form at varying times, some longer and some shorter, it is most efficient to define a sector security class as comprising at least half of the number of subsectors within a given sector. For example, the Retail Trade sector happens to have 12 subsectors. According to our criteria for defining a sector security class, it is only necessary for a retail sector security class to comprise six subsector security classes (i.e., at least half of 12). This allows for considerable flexibility in forming sector security classes and does not compel rapid and premature formation of laggard subsector security classes.

Revenue Generation

It is necessary that each Retail Trade subsector security class generate approximately $167,000 in revenue. When six of these retail subsector security classes are joined together to comprise a retail sector security class, an entity representing about $1 million in generated revenue is formed.

So let us suppose that on Feb. 1, 2000, a company practicing the invention had overseen the formation of five Retail Trade subsector security classes: one each for the subsectors entitled "Building Material and Garden Equipment and Supplies Dealers," "Gasoline Stations," "Motor Vehicles and Parts Dealers," "Health and Personal Care Stores," and "General Merchandise Stores." With the completion of the Food and Beverage Stores subsector security class on Feb. 1, 2001, a company practicing the invention would then conjoin all six of these completed security classes to comprise a retail sector security class.

Meanwhile, the company would have been working on the formation of 27 other sector security classes, one for each of the following:

Agriculture, Forestry, Fishing and Hunting
Mining
Utilities
Construction
Manufacturing (1)
Manufacturing (2)
Manufacturing (3)
Manufacturing (4)
Manufacturing (5)
Manufacturing (6)
Manufacturing (7)
Manufacturing (8)
Manufacturing (9)
Wholesale Trade
Transportation and Warehousing
Information
Finance and Insurance
Real Estate and Rental and Leasing
Professional, Scientific, and Technical Services
Management of Companies and Enterprises
Administrative and Support and Waste Management and Remediation Services
Educational Services
Health Care and Social Assistance
Arts, Entertainment, and Recreation
Accommodation and Food Services
Other Services (except Public Administration)
Public Administration
Round Three Macroeconomic Security Class Formation Security classes for each of these sectors, once formed, are then grouped to comprise a macroeconomic security class. As with the formation of sector security classes, the company would expect that certain sector security classes would require longer periods of time to form than others. In order to ensure that laggard sectors do not hinder the method, a macroeconomic security class is flexibly defined as comprising any 14 of these 28 sectors. It is believed that any 14 of these 28 sectors would provide a significant measure of diversification and broad macroeconomic exposure.

Let us suppose that on Feb. 1, 2000, the company needed the formation of one more sector security class in order to form a macroeconomic security class. The following thirteen security classes, let us suppose, were already completed:

Manufacturing (1) (with emphasis on Food and Beverages)
Manufacturing (6) (with emphasis on Defense Equipment)
Manufacturing (7) (with emphasis on Computers)
Manufacturing (8) (with emphasis on Electronics)
Finance and Insurance
Health Care and Social Assistance
Mining
Agriculture, Forestry, Fishing and Hunting
Arts, Entertainment, and Recreation
Information
Transportation and Warehousing
Utilities
Real Estate and Rental and Leasing With the formation of the Retail Trade sector security class on Feb. 1, a complete macroeconomic security class is formed. All transactions that comprise this massive security class are set aside until about six months have passed. Upon policy expiration, the three processes of loss compensation commence, in order, from specific (on the subsector level) to general (on the macroeconomic or global levels).

It should be noted that a fourth round of loss compensation on the basis of world stocks, providing exposure to the global economy is possible. Such a round of loss compensation becomes all the more viable when the invention is extended internationally.

Loss Compensation

Let us suppose each sector security class represents $1 million in revenue. If this is true, a macroeconomic security class, which is, again, comprised of 14 sector security classes, represents $14 million in generated revenue. Not all of this $14 million, however, is intended for loss compensation on the macroeconomic level. Sixty percent of this sum, about $8,400,000, is reserved for this final round of loss compensation.

To follow this process, we return, again, to the Feb. 1 purchase of insurance covering 3,000 shares of Winn-Dixie Stores with a transaction value of $58,500 ($19.50 per share). Six months later, on Aug. 1, 2000, when the term expires, Winn-Dixie shares traded at $14.50 per share, a decline of about 25.64 percent. The client thus sustained a paper loss of $15,000.

Loss compensation within the subsector. Twenty percent of the premiums generated by the Food and Beverage Stores subsector are funneled toward the establishment of a loss compensation fund for grocer subsector participants only. The Food and Beverage Stores subsector security class generated $167,000 in revenue; 20 percent of this sum is $33,400.

At the end of the six-month period, on Aug. 1, 2000, the securities within the Food and Beverage Stores subsector for which policies were underwritten stood as follows:

| The Kroger Company | |
|---|---|
| Optimal price: | $17.75 per share |
| August 1 closing price: | $21.5625 per share |
| ALL CLASS PARTICIPANTS WITH GAINS ON INVESTMENT. | |
| No loss compensation | |

| Albertson's | |
|---|---|
| Optimal price: | $30.75 per share |
| August 1 closing price: | $30.8125 per share |
| ALL CLASS PARTICIPANTS WITH GAINS ON INVESTMENT. | |
| No loss compensation | |

| Safeway, Inc. | |
|---|---|
| Optimal price: | $39.00 per share |
| August 1 closing price: | $47.00 per share |
| ALL CLASS PARTICIPANTS WITH GAINS ON INVESTMENT. | |
| No loss compensation | |

| Whole Foods Market | |
| --- | --- |
| Optimal price: | $46.25 per share |
| August 1 closing price: | $43.75 per share |
| TWO OF THREE PARTICIPANTS WITH LOSSES ON INVESTMENT. | |
| One participant with gain: purchased at $43.4375. | |
| For the two clients with losses: | |
| One purchased 1,000 shares at $44.375 per share; transaction value $44,437; premium: $1,331,25. ($625 actual sustained loss dollars) (1.4 percent loss) | One purchased 8,000 shares at $46.25 per share; transaction value $370,000; premium: $11,100. ($20,000 actual sustained loss dollars) (5.41 percent loss) |
| Loss Dollars with Optimal Price | $22,500 |
| Actual Loss Dollars | $20,625 |
| Transaction Value in optimal dollars | $416,250 |
| Percentage Loss | 5.41 percent |

| The Great Atlantic Pacific Tea Company | |
| --- | --- |
| Optimal price: | $27.25 per share |
| August 1 closing price: | $14.8125 per share |
| TWO OF TWO PARTICIPANTS WITH LOSSES ON INVESTMENT. | |
| For the two clients with losses: | |
| One purchased 12,000 shares at $27.25 per share; transaction value $327,000; premium: $9,810. ($149,250 actual sustained loss dollars) (45.64 percent loss) Curbs in at 20 percent loss: $65,400 actual sustained loss | One purchased 7,000 shares at $27.00 per share; transaction value $189,000; premium: $5,670. ($85,312.50 actual sustained loss dollars) (45.14 percent loss) Curbs in at 20 percent loss: $37,800 actual sustained loss |
| Loss Dollars with Optimal Price | $236,312.50 |
| Actual Loss Dollars | $234,562.50 |
| Loss dollars with optimal price and curbs in | $103,550 |
| Transaction Value in optimal dollars | $517,750 |
| Percentage Loss | 20.0 percent |

| Marsh Supermarkets | |
| --- | --- |
| Optimal price: | $15.625 per share |
| August 1 closing price: | $15.375 per share |
| ONE OF THREE PARTICIPANTS WITH LOSS ON INVESTMENT. | |
| Two participants with gains: one purchased at $15.00 per share while the other purchased at $14.25 per share. | |
| For the one client with losses: | |
| One purchased 10,000 shares at $15.625 per share; transaction value $156,250; premium: $4,687.50. ($2,500 actual sustained loss dollars) (1.6 percent loss) | |
| Loss Dollars with Optimal Price | $2,500 |
| Actual Loss Dollars | $2,500 |

-continued

| Marsh Supermarkets | |
| --- | --- |
| Transaction Value in optimal dollars | $156,250 |
| Percentage Loss | 1.6 percent |

| Arden Group | |
| --- | --- |
| Optimal price: | $31.25 per share |
| August 1 closing price: | $37.00 per share |
| ALL CLASS PARTICIPANTS WITH GAINS ON INVESTMENT. | |
| No loss compensation | |

| Winn-Dixie Stores. | |
| --- | --- |
| Optimal price: | $20.875 per share |
| August 1 closing price: | $14.50 per share |
| TWO OF TWO PARTICIPANTS WITH LOSSES ON INVESTMENT. | |
| For the two clients with losses: | |
| One purchased 1,000 shares at $20.875 per share; transaction value $20,875; premium: $626.25. ($6,375 actual sustained loss dollars) (30.54 percent loss) Curbs in at 20 percent loss: $4,175 actual sustained loss | One purchased 3,000 shares at $19.50 per share; transaction value $58,500; premium: $1,755. ($15,000 actual sustained loss dollars) (25.64 percent loss) Curbs in at 20 percent loss: $11,700 actual sustained loss |
| Loss Dollars with Optimal Price | $25,500 |
| Actual Loss Dollars | $21,375 |

| | |
|---|---|
| Loss dollars with optimal price and curbs in | $16,700 |
| Transaction Value in optimal dollars | $83,5000 |
| Percentage Loss | 20.0 percent |

| Foodarama | |
|---|---|
| Optimal price: | $21.00 per share |
| August 1 closing price: | $24.25 per share |
| ALL CLASS PARTICIPANTS WITH GAINS ON INVESTMENT. | |
| No loss compensation | |

The Food and Beverage Stores subsector has a total number of $279,062.50 sustained loss dollars that are desirous of compensation. A total of $33,400, however, is available for this first round of compensation. It is thus necessary for the system to deploy the loss threshold mechanism in marking as unqualified certain loss dollars according to previously agreed-upon contract terms.

Prevention of drains on the system. In this example, it is clear that the clients who purchased shares in the Great Atlantic Pacific Tea Company would represent a significant drag on the effectiveness of the system if their losses were not in some fashion stemmed. Indeed, a company practicing the invention does not want the purchase of equity insurance to entail a cessation of investor monitoring of the investment or decision never to sell the security. As a result, this example makes clear that it is necessary that the company place at least a 20 percent cap on the amount of loss that a client can sustain—out of fairness to all other system participants, who also do not want drains on the system. Taking this 20 percent cap into consideration, the Food and Beverage Stores subsector then has a total of $142,200 sustained loss dollars that are desirous of compensation.

Round One: Loss Compensation

How should the company distribute the sum of $33,400 for this first round of loss compensation? It is first important to compile a summary of those clients who are desirous of loss compensation:

| Whole Foods Market | |
|---|---|
| LOSS DOLLARS WITH OPTIMAL PRICE: | $22,500 |
| Transaction value in optimal dollars: | $416,250 |
| PERCENTAGE LOSS: | 5.41 percent |

| The Great Atlantic Pacific Tea Company | |
|---|---|
| LOSS DOLLARS WITH OPTIMAL PRICE AND CURBS IN: | $103,550 |

| The Great Atlantic Pacific Tea Company | |
|---|---|
| Transaction value in optimal dollars: | $517,750 |
| PERCENTAGE LOSS: | 20.0 percent |

| Marsh Supermarkets. | |
|---|---|
| LOSS DOLLARS WITH OPTIMAL PRICE: | $2,500 |
| Transaction value in optimal dollars: | $156,250 |
| PERCENTAGE LOSS: | 1.6 percent |

| Winn-Dixie Stores. | |
|---|---|
| LOSS DOLLARS WITH OPTIMAL PRICE AND CURBS IN: | $16,700 |
| Transaction value in optimal dollars: | $83,500 |
| PERCENTAGE LOSS: | 20.0 percent |

The next step is to place in order, from greatest percentage loss to least, these four investments sustaining loss:

| | |
|---|---|
| The Great Atlantic Pacific Tea Company: | 20 percent |
| Winn-Dixie Stores: | 20 percent |
| Whole Foods Market: | 5.41 percent |
| Marsh Supermarkets: | 1.6 percent |

The process of determining the loss threshold mechanism (as described above) then proceeds:

| | |
|---|---|
| Total number of loss dollars desirous of compensation: | $145,250 |
| Present number of loss dollars available for compensation: | $ 33,400 |
| NEED TO MARK AS UNQUALIFIED: | $111,850 |
| Elimination of Marsh Supermarkets yields 2,500 unqualified dollars. | |
| NEED TO MARK AS UNQUALIFIED: | $109,350 |

-continued

| | |
|---|---|
| Elimination of Whole Foods Market yields 22,500 unqualified dollars. | |
| NEED TO MARK AS UNQUALIFIED: | $86,850 |
| Establishment of 10 percent loss threshold for WIN ($8,350) and GAP ($51,775) clients. | |
| NEED TO MARK AS UNQUALIFIED: | $26,725 |
| Establishment of 11 percent loss threshold for WIN ($9,185) and GAP ($56,952.50) clients. | |
| NEED TO MARK AS UNQUALIFIED: | $20,712.50 |
| [ ... ] | |
| Establishment of 14 percent loss threshold for WIN ($11,690) and GAP ($72,485) clients. | |
| NEED TO MARK AS UNQUALIFIED: | $ 2,675.00 |
| Establishment of 15 percent loss threshold for WIN ($12,525) and GAP ($77,662.50) clients. | |
| NEED TO MARK AS UNQUALIFIED: | −$ 3,337.50. |
| Too many loss dollars marked as unqualified. | |
| FORMULA DEPLOYED: | | x ($517,750) + x ($83,500) = $86,850
$601,250x = $86,850
$86,850/$601,250 = .14444906445

Hence the loss threshold percentage for this first phase of loss compensation is 14.44 percent, meaning that all losses sustained by Food and Beverage Stores subsector participants are confined to 14.44 percent.

First round distribution. A loss threshold percentage of 14.444–4906445 equates to a 5.555093555 percent slice of loss compensation for both GAP and WIN clients.

| | |
|---|---|
| For GAP clients, this entails an optimal compensation of: | $28,761.50 |
| For WIN clients, this entails an optimal compensation of: | $ 4,638.50 |
| TOTAL LOSS COMPENSATION DISTRIBUTION: | $33,400 |

The functioning of the optimal pricing system. Note here that GAP and WIN shareholders have been allotted, respectively, $28,761.50 and $4,638.50 loss compensation dollars. If we were to compensate on the basis of actual loss dollars (and not optimal dollars), GAP shareholders would receive $28,664.28, a lesser figure because we have computed one GAP transaction as occurring at the price of $27.25 when indeed it was transacted at the price of $27.00. Similarly, WIN shareholders would receive $4,409.36, a lesser figure because we have computed one of the WIN transactions as occurring at $20.875 when indeed it was transacted at the price of $19.50.

Nevertheless, it is important to apply the optimal price for these transactions so that clients, as previously discussed, have the incentive to purchase into security classes that are formed on running bases, even those whose participants may already have paper losses. The optimal price mechanism also provides a significant incentive for clients to purchase equity insurance when the markets are on the rise, for this method is capable not only of compensating loss but also providing profit (depending on whether there is a difference between a given client's actual entry point and his or her designated optimal price).

Although the order of client compensation is insignificant, let us say here that the clients who transacted at optimal prices are first compensated. The GAP client who transacted for GAP shares at $27.25 and who sustained $65,400 in actual loss dollars is compensated $18,165.16. The other GAP client, who purchased GAP shares at the non-optimal price of $27.00 per share, is also compensated at the optimal price, receiving $10,596.34. These figures indeed total $28,761.50.

Meanwhile, the WIN client who transacted for WIN shares at $20.875 is compensated $1,159.63. The other WIN client, who purchased WIN shares at the non-optimal price of $19.50 per share, is also compensated at the optimal price, receiving $3,478.88. These figures total $4,638.51, one cent greater than $4,638.50 due to rounding.

It should be noted here that the optimal price mechanism docs not present inequity to any client. Although it may not appear equitable to allow a client to receive loss compensation on the basis of an optimal transaction value, this method compensates those who enter a security class at a time when other system participants are saddled with losses on the same security. The optimal price mechanism allows for the running-basis formation of security classes without the disincentive of other system participants with losses. Thus in practice this method is an equitable value proposition when executed on system-wide and consistent bases.

Computing loss compensation on an optimal basis. The method of loss compensation proceeds on an optimal basis by first computing the transaction value as occurring at the optimal price for all system participants. The method then multiplies this number by 0.2, providing the figure that represents the amount of insurable loss. This figure was then multiplied by 0.27775467775, which was the quotient of 0.05555093555 (the loss compensation percentage) and 0.20. The result of this is the amount of loss compensation on an optimal basis.

Round Two: Loss Compensation

At the end of the first phase of loss compensation, GAP and WIN shareholders had their losses reduced to 14.44 percent while the losses of MARSA and WFMI shareholders remained at, respectively, 1.6 percent and 5.41 percent.

As with the first phase of loss compensation, the second round—which is on the more encompassing level of sector—distributes a sum that is equal to 20 percent of the revenues generated by the Food and Beverage Stores subsector. Significantly, however, each subsector that comprises the sector security class puts forward 20 percent of revenues. Because each retail subsector generates a total of $167,000 and a retail sector security class comprises six subsectors, the total amount of loss compensation available for this phase is $200,400 ($33,400*6).

The amount of loss compensation for the Food and Beverage Stores subsector at this level depends, of course, on how well the other five subsectors of the Retail Trade sector security class performed.

Let us suppose that after the six-month expiration of coverage and its first round of loss compensation, the Retail Trade sector security class (that which includes the above Food and Beverage Stores subsector security class) stood as follows:

Building Material and Garden Equipment and Supplies Dealers

| The Home Depot, Inc. (symbol HD, NYSE) | |
|---|---|
| Optimal price: | $62.00 per share |
| Aug. 1 closing price: | $52.00 per share |
| FOUR OF FOUR PARTICIPANTS WITH LOSSES | |
| Premium | $ 66,800 |
| Transaction value | $2,226,666.67 |
| Shares purchased | 35,914 |
| Percent loss | 16.13 |
| Total loss dollars desirous of compensation: | $ 359,140 |

| Lowe's Companies, Inc. (symbol LOW, NYSE) | |
|---|---|
| Optimal price: | $ 47.0625 per share |
| Aug. 1 closing price: | $ 42.875 per share |
| THREE OF THREE PARTICIPANTS WITH LOSSES | |
| Premium | $ 50,100 |
| Transaction value | $1,670,000 |
| Shares purchased | 35,485 |
| Percent loss | 8.90 |
| Total loss dollars desirous of compensation: | $ 148,593.44 |

| Fastenal Company (symbol FAST, NASDAQ) | |
|---|---|
| Optimal price: | $45.1875 per share |
| Aug. 1 closing price: | $61.25 per share |
| TWO OF TWO PARTICIPANTS WITH GAINS ON INVESTMENT | |
| No loss compensation | |
| Premium | $ 33,400 |
| Transaction value | $1,113,333.34 |

| Central Garden & Pet Company (symbol CENT, NASDAQ) | |
|---|---|
| Optimal price: | $10.125 per share |
| Aug. 1 closing price: | $7.0625 per share |
| ONE OF ONE PARTICIPANT WITH LOSS | |
| Premium | $ 16,700 |
| Transaction value | $556,666.67 |
| Shares purchased | 54,980 |
| Percent loss | 30.25 |
| Total loss dollars desirous of compensation: | $168,376.25 |
| CURBS IN AT 20 PERCENT: | |
| Total loss dollars desirous of compensation: | $111,333.33 |

| Summary of losses: | |
|---|---|
| CENT shareholder loss stands at: | 20.00 percent |
| HD shareholder loss stands at: | 16.13 percent |
| LOW shareholder loss stands at: | 8.90 percent |

| LOSS COMPENSATION, FIRST ROUND: | |
|---|---|
| Total number of loss dollars desirous of compensation: | $619,066.77 |
| Present number of loss dollars available for compensation: | $ 33,400 |
| NEED TO MARK AS UNQUALIFIED: | $585,666.77 |

| Elimination of LOW shareholders yields $148,593.44 unqualified dollars | |
|---|---|
| NEED TO MARK AS UNQUALIFIED: | $437,073.33 |
| FORMULA DEPLOYED: | |
| x ($556,666.67) + x ($2,226,666.67) = $437,073.33 | |
| $2,783,333.34 x = $437,073.33 | |
| $437,073.33/$2,783,333.34 = .15703233376 | |
| LOSS THRESHOLD PERCENTAGE: | 15.70 percent |

| AFTER FIRST ROUND OF LOSS COMPENSATION: | |
|---|---|
| CENT shareholder loss stands at: | 15.70 percent |
| (Compensated $23,919.) | |
| HD shareholder loss stands at: | 15.70 percent |
| (Compensated $9,481.) | |
| LOW shareholder loss stands at: | 8.90 percent |

Gasoline Stations (with Convenience Stores)

| The Pantry, Inc. (symbol PTRY, NASDAQ) | |
|---|---|
| Optimal price: | $13.75 per share |
| Aug. 1 closing price: | $10.25 per share |
| FOUR OF FOUR PARTICIPANTS WITH LOSSES | |
| Premium | $ 66,800 |
| Transaction value | $2,226,666.67 |
| Shares purchased | 161,940 |
| Percent loss | 25.45 |
| CURBS IN AT 20 PERCENT: | |
| Total loss dollars desirous of compensation: | $ 445,333.34 |

| Casey's General Stores, Inc. (symbol CASY, NASDAQ) | |
|---|---|
| Optimal price: | $10.50 per share |
| Aug. 1 closing price: | $11.625 per share |
| THREE OF THREE PARTICIPANTS WITH GAINS | |
| No loss compensation | |
| Premium | $ 50,10 |
| Transaction value | $1,670,000 |

| Ito-Yokado Co., Ltd. (symbol IYCOY, NASDAQ) | |
|---|---|
| Optimal price: | $92.00 per share |
| Aug. 1 closing price: | $55.75 per share |
| TWO OF TWO PARTICIPANTS WITH LOSS | |
| Premium | $ 33,400 |
| Transaction value | $1,113,333.34 |

|                                          |              |
| ---------------------------------------- | ------------ |
| Shares purchased                         | 12,102       |
| Percent loss                             | 39.40        |

CURBS IN AT 20 PERCENT:

|                                          |              |
| ---------------------------------------- | ------------ |
| Total loss dollars desirous of compensation: | $222,666.67 |

Dairy Mart Convenience Stores, Inc. (symbol DMC, AMEX)

| | |
|---|---|
| Optimal price: | $3.25 per share |
| Aug. 1 closing price: | $5.50 per share |

ONE OF ONE PARTICIPANT WITH GAIN
No loss compensation

| | |
|---|---|
| Premium | $ 16,700 |
| Transaction value | $556,666.67 |

Summary of losses:

| | |
|---|---|
| PTRY shareholder loss stands at: | 20.00 percent |
| IYCOY shareholder loss stands at: | 20.00 percent |

LOSS COMPENSATION, FIRST ROUND:

| | |
|---|---|
| Total number of loss dollars desirous of compensation: | $668,000.01 |
| Present number of loss dollars available for compensation: | $ 33,400 |
| NEED TO MARK AS UNQUALIFIED: | $634,600.01 |

FORMULA DEPLOYED x ($1,113,333.34) + x ($2,226,666.67) = $634,600.01
$3,340,000.01 x = $634,600.01
$634,600.01/$3,340,000.01 = .19000000243

| | |
|---|---|
| LOSS THRESHOLD PERCENTAGE: | 19.00 percent |

AFTER FIRST ROUND OF LOSS COMPENSATION:

| | |
|---|---|
| PTRY shareholder loss stands at: (Compensated $22,267.) | 19.00 percent |
| IYCOY shareholder loss stands at: (Compensated $11,133.) | 19.00 percent |

Motor Vehicles and Parts Dealers

AutoZone, Inc. (symbol AZO, NYSE)

| | |
|---|---|
| Optimal price: | $26.3125 per share |
| Aug. 1 closing price: | $22.875 per share |

FOUR OF FOUR PARTICIPANTS WITH LOSSES

| | |
|---|---|
| Premium | $ 66,800 |
| Transaction value | $2,226,666.67 |
| Shares purchased | 84,624 |
| Percent loss | 13.06 |
| Total loss dollars desirous of compensation: | $ 290,895 |

Auto Parts, Inc. (symbol DAP, NYSE)

| | |
|---|---|
| Optimal price: | $15.9375 per share |
| Aug. 1 closing price: | $8.3125 per share |

THREE OF THREE PARTICIPANTS WITH LOSSES

| | |
|---|---|
| Premium | $ 50,100 |
| Transaction value | $1,670,000 |
| Shares purchased | 104,785 |
| Percent loss | 47.84 |

CURBS IN AT 20 PERCENT:

| | |
|---|---|
| Total loss dollars desirous of compensation: | $ 334,000 |

Genuine Parts Company (symbol GPC, NYSE)

| | |
|---|---|
| Optimal price: | $23.0625 per share |
| Aug. 1 closing price: | $20.3125 per share |

TWO OF TWO PARTICIPANTS WITH LOSSES

| | |
|---|---|
| Premium | $ 33,400 |
| Transaction value | $1,113,333.34 |
| Shares purchased | 48,275 |
| Percent loss | 11.92 |
| Total loss dollars desirous of compensation: | $ 132,756.25 |

The Pep Boys - Manny, Moe & Jack (symbol PBY, NYSE)

| | |
|---|---|
| Optimal price: | $7.375 per share |
| Aug. 1 closing price: | $6.375 per share |

ONE OF ONE PARTICIPANT WITH LOSS

| | |
|---|---|
| Premium | $ 16,700 |
| Transaction value | $556,666.67 |
| Shares purchased | 75,481 |
| Percent loss | 13.56 |
| Total loss dollars desirous of compensation: | $ 75,481 |

Summary of losses:

| | |
|---|---|
| DAP shareholder loss stands at | 18.00 percent |
| PBY shareholder loss stands at: | 13.56 percent |
| AZO shareholder loss stands at: | 13.06 percent |
| GPC shareholder loss stands at: | 11.92 percent |

LOSS COMPENSATION, FIRST ROUND:

| | |
|---|---|
| Total number of loss dollars desirous of compensation: | $833,132.25 |
| Present number of loss dollars available for compensation: | $ 33,400 |
| NEED TO MARK AS UNQUALIFIED: | $799,732.25 |
| Elimination of GPC loss yields $132,756.25 unqualified dollars | |
| NEED TO MARK AS UNQUALIFIED: | $666,976 |
| Elimination of AZO loss yields $290,895 unqualified dollars | |

-continued

| | |
|---|---|
| NEED TO MARK AS UNQUALIFIED: | $376,081 |
| Elimination of PBY loss yields $75,481 unqualified dollars | |
| NEED TO MARK AS UNQUALIFIED: | $300,600 |
| FORMULA DEPLOYED: | | x ($1,670,000) = $300,600
$300,600/$1,670,000 = .18

| | |
|---|---|
| LOSS THRESHOLD PERCENTAGE: | 18.00 percent |

AFTER FIRST ROUND OF LOSS COMPENSATION:

| | |
|---|---|
| DAP shareholder loss stands at: (Compensated $33,400.) | 18.00 percent |
| PBY shareholder loss stands at: | 13.56 percent |
| AZO shareholder loss stands at: | 13.06 percent |
| GPC shareholder loss stands at: | 11.92 percent |

Health and Personal Care Stores

Walgreen Co. (symbol WAG, NYSE)

| | |
|---|---|
| Optimal price: | $28.8125 per share |
| Aug. 1 closing price: | $30.9375 per share |
| FOUR OF FOUR PARTICIPANTS WITH GAINS | |
| No loss compensation | |
| Premium | $ 66,800 |
| Transaction value | $2,226,666.67 |

CVS Corporation (symbol CVS, NYSE)

| | |
|---|---|
| Optimal price: | $35.0625 per share |
| Aug. 1 closing price: | $38.75 per share |
| THREE OF THREE PARTICIPANTS WITH GAINS | |
| No loss compensation | |
| Premium | $ 50,100 |
| Transaction value | $1,670,000 |

Alberto-Culver Company (symbol ACV, NYSE)

| | |
|---|---|
| Optimal price: | $24.50 per share |
| Aug. 1 closing price: | $30.8125 per share |
| TWO OF TWO PARTICIPANTS WITH GAINS | |
| No loss compensation | |
| Premium | $ 33,400 |
| Transaction value | $1,113,333.34 |

Duane Reade Inc. (symbol DRD, NYSE)

| | |
|---|---|
| Optimal price: | $23.1875 per share |
| Aug. 1 closing price: | $24.10 per share |
| ONE OF ONE PARTICIPANT WITH GAIN | |
| No loss compensation | |
| Premium | $ 16,700 |
| Transaction value | $556,666.67 |

Summary of losses:

No client has a loss on investment.

General Merchandise Stores

The May Department Stores Company (symbol MAY, NYSE)

| | |
|---|---|
| Optimal price: | $31.0625 per share |
| Aug. 1 closing price: | $24.0625 per share |
| FOUR OF FOUR PARTICIPANTS WITH LOSSES | |
| Premium | $ 66,800 |
| Transaction value | $2,226,666.67 |
| Shares purchased | 71,684 |
| Percent loss | 22.54 |
| CURBS IN AT 20 PERCENT: | |
| Total loss dollars desirous of compensation: | $ 445,333.34 |

Sears, Roebuck and Co. (symbol S, NYSE)

| | |
|---|---|
| Optimal price: | $31.4375 per share |
| Aug. 1 closing price: | $31.00 per share |
| THREE OF THREE PARTICIPANTS WITH LOSSES | |
| Premium | $ 50,100 |
| Transaction value | $1,670,000 |
| Shares purchased | 53,122 |
| Percent loss | 1.39 |
| Total loss dollars desirous of compensation: | $ 3,240.88 |

J. C. Penney Company, Inc. (symbol JCP, NYSE)

| | |
|---|---|
| Optimal price: | $ 18.8125 |
| Aug. 1 closing price: | $17.50 per share |
| TWO OF TWO PARTICIPANTS WITH LOSSES | |
| Premium | $ 33,400 |
| Transaction value | $1,113,333.34 |
| Shares purchased | 59,181 |
| Percent loss | 6.98 |
| Total loss dollars desirous of compensation: | $ 77,675.07 |

Kohl's Corporation (symbol KSS, NYSE)

| | |
|---|---|
| Optimal price: | $ 73.125 |
| Aug. 1 closing price: (Split-adjusted) | $ 115.25 |
| ONE OF ONE PARTICIPANT WITH GAIN | |
| No loss compensation | |
| Premium | $ 16,700 |
| Transaction value | $556,666.67 |

Summary of losses:

| | |
|---|---|
| MAY shareholder loss stands at | 20.00 percent |
| JCP shareholder loss stands at | 6.98 percent |
| S shareholder loss stands at | 1.39 percent |

| LOSS COMPENSATION, FIRST ROUND: | |
| --- | --- |
| Total number of loss dollars desirous of compensation: | $546,249.29 |
| Present number of loss dollars available for compensation: | $ 33,400 |
| NEED TO MARK AS UNQUALIFIED: | $512,849.29 |
| Elimination of S loss yields $23,240.88 unqualified dollars. | |
| NEED TO MARK AS UNQUALIFIED: | $489,608.41 |
| Elimination of JCP loss yields $77,675.07 unqualified dollars. | |
| NEED TO MARK AS UNQUALIFIED: | $411,933.34 |
| FORMULA DEPLOYED | |
| x ($2,226,666.67) = $411,933.34 | |
| $411,933.34/$2,226,666.67 = 18500000272 | |
| LOSS THRESHOLD PERCENTAGE: | 18.50 percent |

| AFTER FIRST ROUND OF LOSS COMPENSATION: | |
| --- | --- |
| MAY shareholder loss stands at (Compensated $33,400.) | 18.50 percent |
| JCP shareholder loss stands at | 6.98 percent |
| S shareholder loss stands at | 1.39 percent |

Summary Results

In order to compute loss compensation on the basis of sector performance (i.e., the second round of loss compensation), it is necessary first to compile the results of first-round loss compensation that occurred on a subsector basis.

The subsector summary results for the above example are:

| Food and Beverage Stores | |
| --- | --- |
| GAP shareholder loss stands at: ($74,788.50 loss dollars desirous of compensation) | 14.44 percent |
| WIN shareholder loss stands at: ($12,061.50 loss dollars desirous of compensation) | 14.44 percent |
| WFMI shareholder loss stands at: ($22,500 loss dollars desirous of compensation) | 5.41 percent |
| MARSA shareholder loss stands at: ($2,500 loss dollars desirous of compensation) | 1.6 percent |

| Building Material and-Garden Equipment and Supplies Dealers | |
| --- | --- |
| CENT shareholder loss stands at: ($87,414.33 loss dollars desirous of compensation) | 15.70 percent |
| HD shareholder loss stands at: ($349,659 loss dollars desirous of compensation) | 15.70 percent |
| LOW shareholder loss stands at: ($148,593.44 loss dollars desirous of compensation) | 8.90 percent |

| Gasoline Stations (With Convenience Stores) | |
| --- | --- |
| PTRY shareholder loss stands at: ($22,267 loss dollars desirous of compensation) | 19.00 percent |
| IYCOY shareholder loss stands at: ($11,133 loss dollars desirous of compensation) | 19.00 percent |

| Motor Vehicles and Parts Dealers | |
| --- | --- |
| DAP shareholder loss stands at: ($300,600 loss dollars desirous of compensation) | 18.00 percent |
| PBY shareholder loss stands at: ($75,481 loss dollars desirous of compensation) | 13.56 percent |
| AZO shareholder loss stands at: ($290,895 loss dollars desirous of compensation) | 13.06 percent |
| GPC shareholder loss stands at: ($132,756.25 loss dollars desirous of compensation) | 11.92 percent |

Health and Personal Care Stores

No clients with loss.

| General Merchandise Stores | |
| --- | --- |
| MAY shareholder loss stands at: ($411,933.34 loss dollars desirous of compensation) | 18.50 percent |
| JCP shareholder loss stands at: ($77,675.07 loss dollars desirous of compensation) | 6.98 percent |
| S shareholder loss stands at: ($23,240.88 loss dollars desirous of compensation) | 1.39 percent |

As previously noted, the second round's loss compensation fund stands at $200,400.

Loss compensation for this round proceeds as usual.

First, a ranking of securities according to percentage loss, from greatest to least, is compiled:

| | |
| --- | --- |
| PTRY shareholder loss stands at: ($423,066.34 loss dollars desirous of compensation) | 19.00 percent |
| IYCOY shareholder loss stands at: ($211,533.67 loss dollars desirous of compensation) | 19.00 percent |
| MAY shareholder loss stands at: ($411,933.34 loss dollars desirous of compensation) | 18.50 percent |
| DAP shareholder loss stands at: ($300,600 loss dollars desirous of compensation) | 18.00 percent |
| CENT shareholder loss stands at: (87,414.33 loss dollars desirous of compensation) | 15.70 percent |
| HD shareholder loss stands at: (349,659 loss dollars desirous of compensation) | 15.70 percent |
| GAP shareholder loss stands at: (74,788.50 loss dollars desirous of compensation) | 14.44 percent |
| WIN shareholder loss stands at: (12,061.50 loss dollars desirous of compensation) | 14.44 percent |
| PBY shareholder loss stands at: ($75,481 loss dollars desirous of compensation) | 13.56 percent |
| AZO shareholder loss stands at: ($290,895 loss dollars desirous of compensation) | 13.06 percent |
| GPC shareholder loss stands at: ($132,756.25 loss dollars desirous of compensation) | 11.92 percent |
| LOW shareholder loss stands at: ($148,593.44 loss dollars desirous of compensation) | 8.90 percent |
| JCP shareholder loss stands at: ($77,675.07 loss dollars desirous of compensation) | 6.98 percent |
| WFMI shareholder loss stands at: (22,500 loss dollars desirous of compensation) | 5.41 percent |
| MARSA shareholder loss stands at: (2,500 loss dollars desirous of compensation) | 1.6 percent |
| S shareholder loss stands at: ($23,240.88 loss dollars desirous of compensation) | 1.39 percent |

| LOSS COMPENSATION, SECOND ROUND: | |
|---|---|
| Total number of loss dollars desirous of compensation: | $2,644,698.32 |
| Present number of loss dollars available for compensation: | $ 200,400 |
| NEED TO MARK AS UNQUALIFIED: | $2,444,298.32 |
| Elimination of S loss yields $23,240.88 unqualified dollars. | |
| NEED TO MARK AS UNQUALIFIED: | $2,421,057.44 |
| Elimination of MARSA loss yields $2,500 unqualified dollars. | |
| NEED TO MARK AS UNQUALIFIED: | $2,418,557.44 |
| Elimination of WFMI loss yields $22,500 unqualified dollars. | |
| NEED TO MARK AS UNQUALIFIED: | $2,396,057.44 |
| Elimination of JCP loss yields $77,675.07 unqualified dollars. | |
| NEED TO MARK AS UNQUALIFIED: | $2,318,382.37 |
| Elimination of LOW loss yields $148,593.44 unqualified dollars. | |
| NEED TO MARK AS UNQUALIFIED: | $2,169,788.93 |
| Elimination of GPC loss yields $132,756.25 unqualified dollars. | |
| NEED TO MARK AS UNQUALIFIED: | $2,037,032.68 |
| Elimination of AZO loss yields $290,895 unqualified dollars. | |
| NEED TO MARK AS UNQUALIFIED: | $1,746,137.68 |
| Elimination of PBY loss yields $75,481 unqualified dollars. | |
| NEED TO MARK AS UNQUALIFIED: | $1,670,656.68 |
| Elimination of WIN loss yields $12,061.50 unqualified dollars. | |
| NEED TO MARK AS UNQUALIFIED: | $1,658,595.18 |
| Elimination of GAP loss yields $74,788.50 unqualified dollars. | |
| NEED TO MARK AS UNQUALIFIED: | $1,583,806.68 |
| Elimination of HD loss yields $349,659 unqualified dollars. | |
| NEED TO MARK AS UNQUALIFIED: | $1,234,147.68 |
| Elimination of CENT loss yields $87,414.33 unqualified dollars. | |
| NEED TO MARK AS UNQUALIFIED: | $1,146,733.35 |
| FORMULA DEPLOYED: | | x ($1,670,000) + x ($2,226,666.67) +
x ($1,113,333.34) +
x ($2,226,666.67) = $1,146,733.35
$7,236,666.68 x = $1,146,733.35
$1,146,733.35/$7,236,666.68 = .15846154047
LOSS THRESHOLD PERCENTAGE: 15.85 percent Summary Results In order to compute loss compensation on the basis of macroeconomic performance (i.e., the third round of loss compensation), it is necessary first to compile the results of second-round loss compensation that occurred on a sector basis.

The Retail Trade sector summary results for the above example are as follows:

| | |
|---|---|
| PTRY shareholder loss stands at: | 15.85 percent |
| (Compensated $70,226.) | |
| ($352,840.34 loss dollars desirous of compensation) | |
| IYCOY shareholder loss stands at: | 15.85 percent |
| (Compensated $35,113) | |
| ($176,420.67 loss dollars desirous of compensation) | |
| MAY shareholder loss stands at: | 15.85 percent |
| (Compensated $59,092) | |
| ($411,933.34 loss dollars desirous of compensation) | |
| DAP shareholder loss stands at: | 15.85 percent |
| Compensated $35,969) | |
| ($264,631 loss dollars desirous of compensation) | |
| CENT shareholder loss stands at: | 15.70 percent |
| ($87,414.33 loss dollars desirous of compensation) | |
| HD shareholder loss stands at: | 15.70 percent |
| ($349,659 loss dollars desirous of compensation) | |
| GAP shareholder loss stands at: | 14.44 percent |
| ($74,788.50 loss dollars desirous of compensation) | |
| WIN shareholder loss stands at: | 14.44 percent |
| ($12061.50 loss dollars desirous of compensation) | |
| PBY shareholder loss stands at: | 13.56 percent |
| ($75,481 loss dollars desirous of compensation) | |
| AZO shareholder loss stands at: | 13.06 percent |
| ($290,895 loss dollars desirous of compensation) | |
| GPC shareholder loss stands at: | 11.92 percent |
| ($132,756.25 loss dollars desirous of compensation) | |
| LOW shareholder loss stands at: | 8.90 percent |
| ($148,593.44 loss dollars desirous of compensation) | |
| JCP shareholder loss stands at: | 6.98 percent |
| ($77,675.07 loss dollars desirous of compensation) | |
| WFMI shareholder loss stands at: | 5.41 percent |
| ($22,500 loss dollars desirous of compensation) | |
| MARSA shareholder loss stands at: | 1.6 percent |
| ($2,500 loss dollars desirous of compensation) | |
| S shareholder loss stands at: | 1.39 percent |
| ($23,240.88 loss dollars desirous of compensation) | |

Round Three of Loss Compensation

The final round of loss compensation is intended to expose policyholders to the macroeconomy. The percentage of revenue that is allotted to this realm suggests the degree of significance given to the diversification that this realm provides. In this way one could say that equity insurance represents commodified diversification but without the low growth prospects of mutual funds.

To begin this round, it is first necessary to add up the number of Retail Trade loss dollars that remain desirous of compensation. Adding up the figures that are present in the summary above indicates that at this stage a total of $2,503,390.32 dollars remain desirous of compensation. The loss compensation fund is established at $8,400,000 for this round, a figure that equals 60 percent of revenues from each of 14 sector security classes.

To begin, the system must calculate an average Retail Trade sector percentage loss figure. Based on the figures above, the average Retail Trade sector percentage loss (excluding gains and equating each percentage loss as equal to each other) was 11.66 percent (186.5/16).

Utilizing sector mutual funds, one can ascertain general sector performance for a given period of time. Although these indicators are flawed for this purpose due to their inclusion of gains in the calculation of percentage of depreciation, they are nevertheless useful toward providing a general idea as to a sector's performance during a given period of time. These mutual funds are utilized for the sake of this embodiment and would likely not be employed in practice.

The following are the suggested sector performances, according to mutual fund performances, for the period Feb. 1, 2000, to Aug. 1, 2000, including the retail sector for comparison purposes:

Manufacturing (6) (with emphasis on Defense Equipment) (symbol FSDAX, from $35.08 to $40.60)
15.74 percent appreciation
Mutual fund: Fidelity Select Defense & Aerospace
Finance and Insurance
(symbol FSRBX, from $30.57 to $27.98)
8.47 percent depreciation
Mutual fund: Fidelity Select Banking
Manufacturing (7) (with emphasis on Computers) (symbol FDCPX, from $105.09 to $109.09)
3.81 percent appreciation
Mutual fund: Fidelity Select Computers
Health Care and Social Assistance (symbol VGHCX, from $100.01 to $121.37)
21.36 percent appreciation
Mutual fund: Vanguard Specialized Health Care
Manufacturing (8) (with emphasis on Electronics) (symbol FSELX, from $95.63 to $104.90)
9.69 percent appreciation
Mutual fund: Fidelity Select Electronics
Agriculture, Forestry, Fishing and Hunting
(symbol FDFAX, from $34.06 to $39.96)
17.32 percent appreciation
Mutual fund: Fidelity Select Food & Agriculture
Real Estate and Rental and Leasing
(symbol FRESX, from $14.67 to $18.40)
25.43 percent appreciation
Mutual fund: Fidelity Real Estate Investment
Manufacturing (1)
(with emphasis on Food and Beverages)
(symbol FDFAX, from $34.06 to $39.96)
17.32 percent appreciation
Mutual fund: Fidelity Select Food & Agriculture
Arts, Entertainment, and Recreation
(symbol RYLIX, from $11.22 to $10.45)
6.86 percent depreciation
Mutual fund: Rydex Leisure
Mining
(symbol RYPMX, from $19.75 to $17.78)
9.97 percent depreciation
Mutual fund: Rydex Precious Metals
Retail Trade
11.66 percent depreciation
Information
(symbol FSTCX, from $91.39 to $74.46)
18.53 percent depreciation
Mutual fund: Fidelity Select Telecommunications
Transportation and Warehousing
(symbol RYPIX, from $5.85 to $6.37)
8.89 percent appreciation
Mutual Rydex Transportation
Utilities
(symbol EVTMX, from $11.75 to 10.93)
6.98 percent depreciation
Mutual fund: Eaton Vance Utilities The process of loss compensation can proceed by compiling a list of those depreciated sectors, in order from greatest decline to least. Keep in mind that that these figures would in practice reflect the first two rounds of loss compensation.

Information (symbol FSTCX, from $91.39 to $74.46)
18.53 percent depreciation
Mutual fund: Fidelity Select Telecommunications
Retail Trade
11.66 percent depreciation
Mining (symbol RYPMX, from $19.75 to $17.78)
9.97 percent depreciation
Mutual fund: Rydex Precious Metals
Finance and Insurance (symbol FSRBX, from $30.57 to $27.98)
8.47 percent depreciation
Mutual fund: Fidelity Select Banking
Arts, Entertainment, and Recreation (symbol RYLIX, from $11.22 to $10.45)
6.86 percent depreciation
Mutual fund: Rydex Leisure
Utilities (symbol EVTMX, from $11.75 to 10.93)
6.98 percent depreciation
Mutual fund: Eaton Vance Utilities If the retail sector has an average loss of 11.66 percent and, as previously noted, a total of $2,503,390.32 dollars remain desirous of compensation, then one can begin to calculate general figures for the number of loss dollars seeking compensation that comprise the depreciated sectors of Information, Mining, Finance and Insurance, Arts, Entertainment, & Recreation, and Utilities. (The depreciated securities within appreciated sectors were most likely compensated during the first- and second-rounds of loss compensation.)

Let us suppose, for example, that the Information sector has a total of $3,978,373 loss dollars desirous of compensation. (If 11.66 x=$2,503,390.32, then x=$214,698.99828, or rounded: $214,699. So, 18.53 multiplied by $214,699 yields approximately $3,978,373. All numbers below are approximate.)

Along these lines, the depreciated sectors contain the following estimated numbers of loss dollars that are desirous of compensation, with the third round of loss compensation then proceeding:

Information
18.53 percent depreciation
$3,978,373 loss dollars desirous of compensation
Retail Trade
11.66 percent depreciation
$2,503,391 loss dollars desirous of compensation
Mining
9.97 percent depreciation
$2,140,550 loss dollars desirous of compensation
Finance and Insurance
8.47 percent depreciation
$1,818,501 loss dollars desirous of compensation
Arts, Entertainment, and Recreation
6.86 percent depreciation
$1,472,836 loss dollars desirous of compensation
Utilities
6.98 percent depreciation
$1,498,599 loss dollars desirous of compensation

| LOSS COMPENSATION, THIRD ROUND: | |
|---|---|
| Total number of loss dollars desirous of compensation: | $13,412,250 |
| Present number of loss dollars available for compensation: | $ 8,400,000 |
| NEED TO MARK AS UNQUALIFIED: | $ 5,012,250 |
| FORMULA DEPLOYED: | |
| x ($33,300,000) + x ($33,300,000) + x ($33,300,000) + x ($33,300,000) + x ($33,300,000) + x ($33,300,000) = $5,012,250. $199,800,000 x = $5,012,250 $5,012,250/$199,800,000 = .025086336 | |
| FINAL LOSS THRESHOLD PERCENTAGE: | 2.50 PERCENT |

This final loss threshold percentage means that all losses—save 2.50 percent of each—receive compensation.

The $15,000 optimal loss sustained on 3,000 shares of Winn-Dixie Stores receives in loss compensation approximately $12,212. With insurable loss capped at $12,525 (20 percent) utilizing an optimal transaction value of $62,625, the compensation of approximately $12,212 reflects 97.50 percent coverage of optimal (and capped) loss.

Let us assume that the client sold the WIN shares upon sustaining a 20 percent loss in actual dollars. This would mean that the client disposed of the actual $58,500 transaction upon losing $11,700 in actual dollars, excluding commissions. The compensation of $12,212 (optimal becomes actual) means that the client received more than 100 percent compensation of losses—indeed profiting $512, excluding commissions.

Because of this profit, this system may be capable of competing with, or supplementing, the strategy of writing covered calls.

Important Final Notes

The automatic and upfront loss threshold device

One concern about this method pertained to the challenge of securing clients for those security classes that are unrelated to "high technology" and biotechnology. A company practicing the invention probably would not want to underwrite policies only for small- and mid-capitalization companies that are perceived as higher-risk investments. This method therefore has a built-in flexibility in its ability to define security classes loosely without compromising the principle of diversification—definitions which themselves are flexible and subject to change depending on company projections. The system, for example, could operate by defining a sector security class as one that generates only $1,000 in revenue (and thereby allow for considerable personalization of client monitoring).

Significantly, however, it is important that a company practicing the invention ensures that investors in lower-risk securities have the incentive to participant in this system. Indeed, their investments in many ways serve as antidotes to the higher-risk investments for which the company likely would receive a sufficient number of orders. The challenge, then, is to make the system equitable and attractive to all investors. Toward this end, the company may provide either lower premiums for lower-risk investments or create an automatic loss threshold device whose application correlates with a given security's sector and that sector's perceived risk level. Using such company- and equity-specific information as revenue, cash balance, profit forecast, P/E ratio and beta, this correlation may vary according to individual security and not just sector risk. Let us suppose, for now, that this device operates on a sector basis. It would function in this case by stipulating that those clients who insure securities in high-risk sectors must sustain upfront, say, a 5 percent loss. In contrast, an investor who seeks insurance for a security with low volatility (generally a lower-risk security) may sustain no upfront loss.

Let us say, for example, that clients who insure their Finance and Insurance stocks—generally a less volatile, less risky sector—begin to express frustration that our technology-invested clients routinely secure most of a given system's loss compensation. These Finance and Insurance investors, in frustration, decide to cease insuring their investments, arguing that a 5 percent loss for them is akin to a 15 percent loss for a technology investor. In other words, a client oriented toward higher-risk investments is often conditioned to greater losses than is a client in lower-risk investments. A company practicing the invention, therefore, might institute a system with the aforementioned automatic and upfront loss threshold device that works to equitably level the conditioned responses to loss.

This device could make more equitable the above system and thereby help to ensure participation from a broad variety of investors.

"Private" Security Class Formation

As another product category, it should be noted that a company practicing the invention can also establish "private" security classes on the basis of individual equity, subsector, and/or sector. Some clients in Finance and Insurance stocks may not want any exposure to the technology sector, for example. As a result, the company could create security classes that are comprised solely of Finance and Insurance stocks. Loss compensation would then focus exclusively on compensating those clients who had underperforming investments within the Finance and Insurance sector.

This value proposition may appeal significantly to clients in lower-risk investments while providing another option for investors who appreciate the diversification of sector- or subsector-specific mutual funds but also desire the possibility of higher rates of growth.

To accommodate higher-risk investors, the company could also create technology-specific—or even, for example, semiconductor-specific—security classes. If all participants are losing 50 percent of their investments, the loss threshold percentage would be rather high, although it certainly would provide some measure of compensation for those clients whose investments significantly underperform their peers. Ultimately, the exact methods and products offered depend considerably on market research.

The Allocation of Risk Capital to Eliminate Residue Loss

Figure 8:
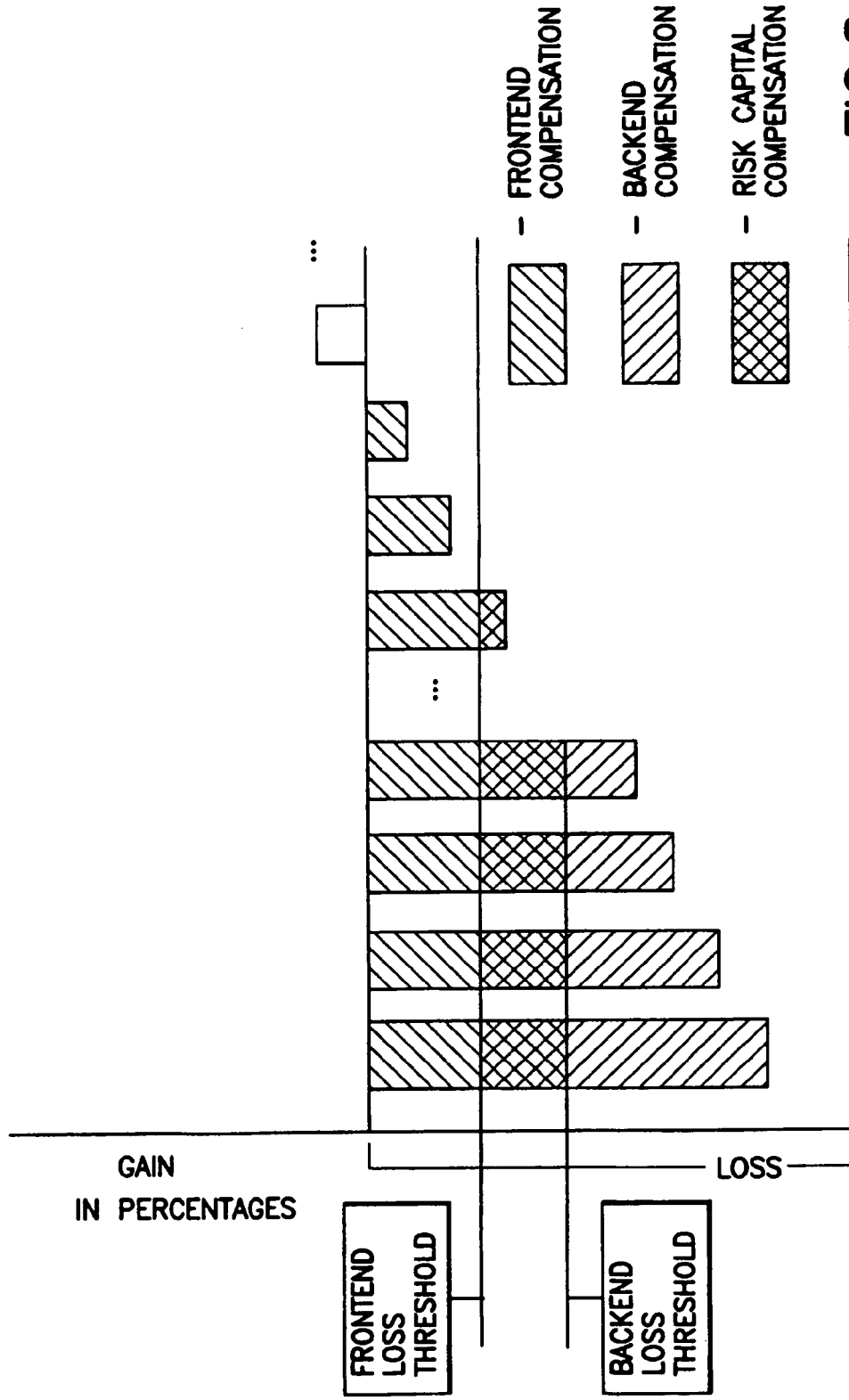
FIG. 8 illustrates an embodiment of loss compensation according to the invention.

In this embodiment, the invention provides a system and method for the brokering of deals between clients that aims to reduce or eliminate, through risk capital allocation, a given client's residue loss—that portion of loss not compensated by the previous processes of loss compensation. This is illustrated in FIG. 8. This option is available to clients whose loss resides below the forward-oriented loss threshold percentage and/or above the reverse-oriented loss threshold percentage.

Like equity insurance, this option provides to clients the ability to purchase diversification without the prospect of low growth rates (i.e., those of mutual funds). It also allows clients the opportunity to eliminate the entire portion of one's sustained loss. It is, in essence, a miniature form of venture capital (VC) or risk capital allocation made especially for retail and institutional loss compensation. The principal differences are that equity need not (and perhaps should not) exchange hands and that business plans are not involved (i.e., there is no venture other than our own): a purchase in the stake of the prospect of another client's equity holding or portfolio is essentially a stake in that client's future profits.

The notion then is that a client (perhaps one with profit) offers to help a client with loss: "you help me this year, and I will try to compensate you next year—for more than you gave me this year." To compensate the individual who puts forward loss compensation, he or she receives, in return, a stake in the losing client's future profits—a stake sufficient to warrant the initial loss compensation. For individual investors, this system makes possible, for the first time, VC-like returns and VC-like excitement. What is identified in the art as "the risk capital market" becomes open, for the first time, to individual investors who are not professional venture capitalists.

An Example:

Suppose a client purchased General Motors stock on Nov. 1, 2000, along with forward-oriented equity insurance, and held onto the stock through Mar. 30, 2001 (the given policy's coverage period or term). At the end of this six-month period, this client sustained a loss on investment of 15.519 percent. The loss threshold percentage for this client's security class was unfortunately high—at 15.529 percent—due to the general market decline that occurred during this period. This client was therefore unable to receive loss compensation from the previous process of loss compensation. (This example does not reflect the three processes of loss compensation that would normally occur.)

The goal of this embodiment of the invention is, as previously noted, to reduce or eliminate this client's sustained loss of 15.519 percent. Significantly, however, this method also aims to provide profit-sustaining clients (and any other individual, including those with losses or company outsiders) with the ability to purchase stakes in the future prospects of client equities, portfolios, trading strategies, futures, options, real estate, etc., and potentially receive VC-like returns. On the one hand, clients could perceive a stake in the future prospect of a conservative portfolio as a low-cost means of acquiring diversification but without the prospect of the low growth rates of mutual funds (i.e., VC-like returns are involved). On the other hand, a client may seek a means to purchase, for little cost, a stake in a high-risk equity and have the opportunity to partake in the significant returns of this equity should they materialize.

The core philosophy involved here, then, is the redistribution of profit for those with loss—a redistribution that stands to mutually benefit both sides of each transaction. It is indeed the philosophy of insurance to provide "an opportunity to share the costs of possible economic loss," to utilize the words of Terry Lowe in his book The Business of Insurance: A Comprehensive Introduction to Insurance (1).

This method also relies on the notion that a significant number of individuals would prefer, if given the choice, that their net worth remain stagnant or increase—but not decrease. Most people find wrenching the experience of losing their hard-earned money (i.e., seeing an investment decline). This particular embodiment relies upon the notion that many individuals are willing to part with a portion of future profits in exchange for a reduction or elimination of the present (and perhaps painful) loss. In this fashion, a company practicing the invention can conditionally guarantee that, through participation, a client's net equity would never decrease—only remain stagnant or increase.

A client with loss (CWL) decides that he or she seeks compensation for his or her loss. Our company asks that the CWL provide certain pieces of information, some of which our company may generate and others which the client may provide. Examples of such information may include the number of years of the client's investing experience and basic information about how the client acquired the loss; was the investment decision poor or did the company announce unexpected news? Certainly, if the client wishes, he or she need not provide any of this information.

The most important part of this method rests in the notion that the CWL makes public his or her desire for loss compensation and specifies the exact amount of desired loss compensation. A company practicing the invention then will perform one of two processes: organize a syndicate of individuals who are willing to compensate this individual for his or her loss; or work to identify a single client who is willing to provide loss compensation. In both cases, the CWL will specify what he or she offers in return for loss compensation. In one embodiment, the CWL will offer a stake in future profits that is sufficient to compensate for the risk that the CWL will not achieve future profits. This agreement will be limited in scope: both by time and the amount of future profits that the risk capitalist can retain.

For example, let us suppose the GM client mentioned above decides that she would like loss compensation for her 15.519 percent loss. Let us suppose this loss stood at $2,000. Due to the sum involved, a company practicing the invention would most likely facilitate the formation of a syndicate. Let us suppose the company finds 20 members to belong to this syndicate, each providing $100 to compensate this client.

In exchange for this compensation (i.e., to encourage the formation of a syndicate), the GM client offers a 100 percent return on the $100 investments should the client achieve sufficient profits within the next year; she notes to prospective members of the syndicate her low-risk portfolio, valued at $100,000, and perhaps promises not to substantially alter this portfolio during the next year. She also notes that her portfolio need only appreciate 4 percent before she can compensate risk capitalists. In essence, this client with loss provides members of the syndicate with an excellent opportunity to receive exposure to certain investment instruments, allows for VC-like returns, and furnishes diversification if indeed the GM client's portfolio is invested in instruments in which members of the syndicate seek diversifying exposure.

The number of possible arrangements between clients is innumerable. For example, one client, in exchange for loss compensation, may offer a stake in future profits sustained in futures trading. The CWL registers the commodities and trading activities; the risk capitalist can check in on the CWL to monitor (but not necessarily impact) these trades—like looking through a glass window.

In another arrangement, a CWL could agree to short a given stock; investors who are adverse to shorting a stock him- or herself may like exposure to such action through an arrangement such as this. An expert in shorting should indicate and validate this expertise in seeking loss compensation.

As another example, a CWL could offer to provide all dividends to a risk capitalist for a given period of time (five years, for example) in exchange for loss compensation.

Or a CWL could explicate his or her trading strategy. Let us say a client employs the Dogs of the Dow strategy. A risk capitalist may provide loss compensation to this individual in exchange for receiving exposure to the Dogs of the Dow strategy.

Essentially all investing strategies, portfolio combinations, investment instruments, and trading activities can become commodified in a way that allow for thorough diversification and significant profit potential.

Example:

Let us say a client wanted to devote $10,000 (5 percent) of his or her portfolio to this method of VC-like risk capital investment/loss compensation. With $10,000, let us say that this client can serve as risk capitalist to 100 different individuals. By receiving exposure to the potential future profits of more than 100 individuals, this risk capitalist provides him- or herself with an ample amount diversified exposure to different trading strategies and investment instruments to which the investor perhaps thought he or she could never receive exposure.

Let us say that some of these 100 individuals end up generating significant profits. By the end of the year, this $10,000 could be as much as $25,000 or more, depending on those arrangements into which the client entered. Although the risk capitalist's investments could also be less than $10,000, a company practicing the invention may offer to insure the system's risk capitalists—representing another business opportunity.

One should note that this method can be conducted on a very small or large scale, with syndicates of 1,000 people each agreeing to pay either $2 or $2,000, for example.

In conclusion, those with profit (or other individuals) redistribute their profit (or risk capital) with the objective of securing additional profit (or capital), doing so in a highly diversified fashion. Although the risk capitalist takes the chance that he or she will not receive a return on investment, a company practicing the invention may insure this risk.

Profit Redistribution

Figure 9:
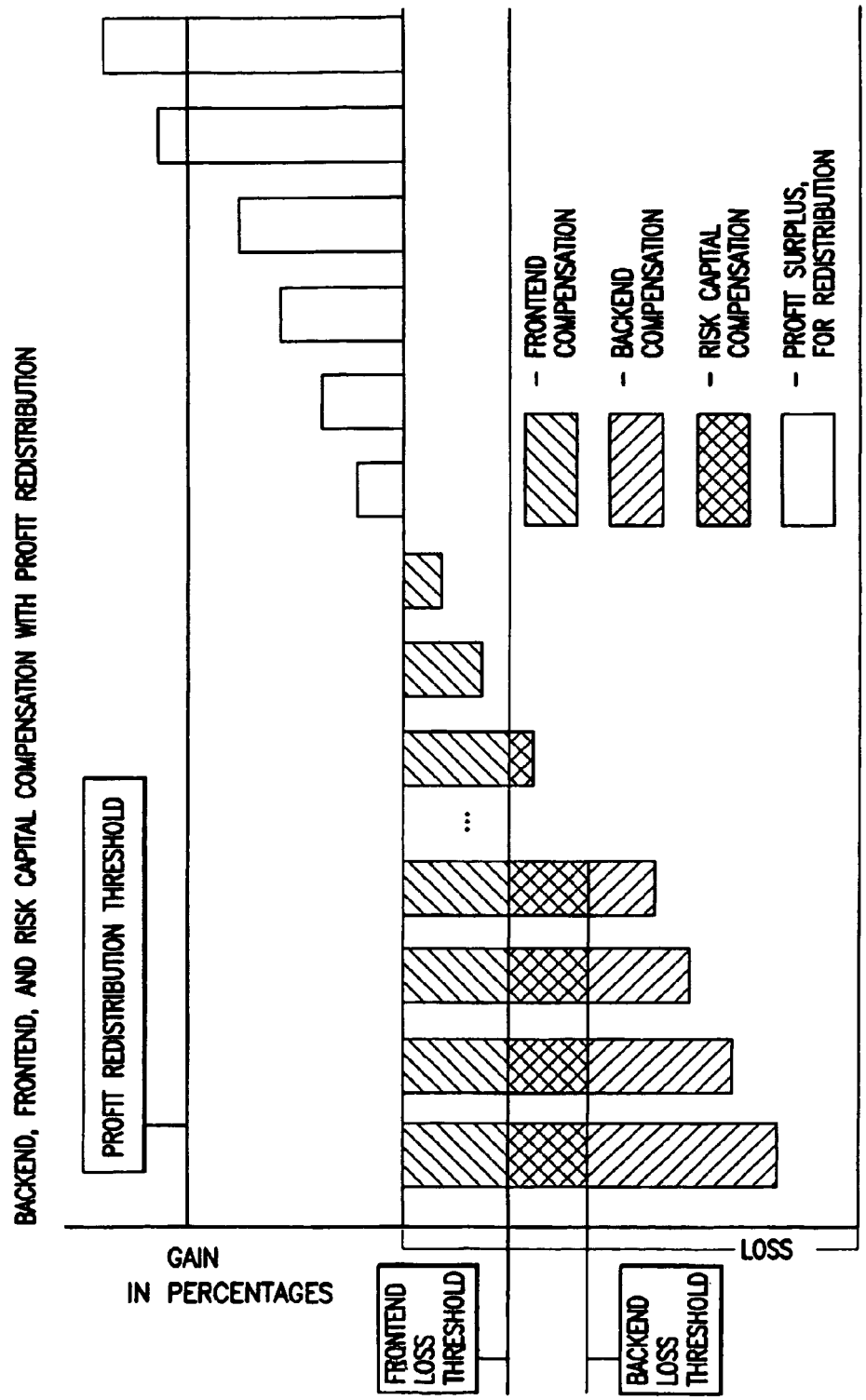
FIG. 9 illustrates an embodiment of loss compensation according to the invention.

Referring to FIG. 9, an example of a profit redistribution embodiment is illustrated. In this embodiment, a level of profit redistribution to all participants is provided with gains distributed until all system losses are reduced to a previously-determined percentage or eliminated. For example, with 10 participants in a system: four with losses totaling $100,000 (each has $25,000 loss) and six with gains totaling $300,000 (each has $50,000 profit). If profit redistribution is the only form of loss compensation, each of the six participants with gains will have their profits reduced by $16,666, or 33.3 percent. The result would be that the net worth of all system participants either remained stagnant or increased.

Another example entails varying levels of profit and loss. A profit redistribution threshold operates in the same fashion as the backend loss compensation threshold; the difference is that the mechanism would treat profit percentages rather than loss percentages. In other words, this embodiment can guarantee through the backend loss threshold mechanism that losses would be limited to a given percentage (that of the loss threshold). Through this profit redistribution threshold mechanism, the invention limits profit percentages in exchange for the added assurance that additional loss compensation is available.

In another embodiment, the method limits profit redistribution to profits beyond a certain percentage or threshold. This percentage is set at a level that will not dissuade a large number of investors from purchasing into the system—for example, gains beyond 50 percent are subject to profit redistribution, but gains less than 45 percent are not subject to profit redistribution.

Although illustrative embodiments have been described herein in detail, it should be noted and will be appreciated by those skilled in the art that numerous variations may be made within the scope of this invention without departing from the principle of this invention and without sacrificing its chief advantages. Such variations include premium distribution.

In this variation, premiums are divided among different loss compensation techniques. A standard premium is divided in half, for example with one half applied to frontend loss compensation and the other half applied to backend loss compensation.

In another variation, premiums are differentially divided. For example, 80 percent of the premium applied to frontend loss compensation and 20 percent of the premium applied to backend loss compensation. In this variation, the investor if favored in the distribution of frontend compensation, but less favored on the backend compensation.

In another variation, there is a roll-over operation between loss reduction funds. For example in a rising market, some funds from some loss-reduction funds may not be needed and can be rolled over to a future loss-reduction fund.

In another variation, the investor determines the threshold, rather than selecting a premium. In this variation, the investor can indicate a high or low tolerance for loss. For example one investor indicates that they are willing to absorb a higher level of loss with an associated reduced premium, and another investor indicates that they are willing to pay more premium with a lower level of loss.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

I claim:

1. A computer-readable storage medium having computer executable software code stored thereon, the code for sharing risk of loss among a plurality of investment instrument holders, the code comprising:
    code to identify a plurality of at least three holders of equity investment instruments that desire sharing of a risk of loss, wherein the equity investment instruments of an individual holder are the same, while at the same time the equity investment instruments of each holder are diverse with respect to the equity investment instruments of other holders, forming a diversified set of equity investment instruments reflecting different and diverse industry sectors or industry subsectors, further wherein performance of the equity investment instruments of an individual holder is closely correlated because the equity investment instruments are the same and investment performance across holders is not closely correlated because the equity investment instruments of different holders reflect different and diverse industry_sectors or industry subsectors;
    code to aggregate premiums to form a loss reduction fund, the premiums at least partially contributed by the plurality of holders;
    code to determine which of losses incurred by the plurality of holders incurred a loss in the respective equity investment instruments at a predetermined time, wherein some of the holders may incur a loss and other holders may not incur a loss;
    code to determine a loss threshold, wherein losses less than the loss threshold incurred by holders that incurred a loss are not reimbursed and at least a portion of the losses greater than the loss threshold incurred by the holders that incurred a loss are reimbursed;
    code to determine losses incurred by the holders that incurred a loss, wherein the amount of loss from one holder may be different from the loss of another holder; and
    code to reimburse at least a portion of the losses greater than the loss threshold incurred by the holders that incurred a loss, wherein reimbursement to a particular equity investment instrument holder is at least partially determined by the loss of the particular holder, with consideration for losses of the plurality of holders, where at least two holders with losses are at least partially reimbursed and other holders may not be reimbursed, and further wherein reimbursement of losses incurred by the holders either depletes the loss reduction fund or all losses incurred by holders are reimbursed from the loss reduction fund.

2. A computer-readable storage medium according to claim 1, wherein reimbursing is from the loss reduction fund.

3. A computer-readable storage medium according to claim 1, wherein reimbursing is from a fund other than the loss reduction fund.

4. A computer-readable storage medium according to claim 1, wherein the premiums are determined as a percentage of an equity investment instrument price.

5. A computer-readable storage medium according to claim 4, wherein the equity investment instrument price is a current share trading price at the time the premiums are aggregated.

6. A computer-readable storage medium according to claim 1, wherein the equity investment instruments are all within the same or related investment categories.

7. A computer-readable storage medium according to claim 6, wherein the investment categories include equity risk.

8. A computer-readable storage medium according to claim 6, wherein the investment categories include beta.

9. A computer-readable storage medium method according to claim 6, wherein the investment categories are selected from a group including Standard Industrial Classification (SIC) codes, North American Industrial Classification System (NAICS), securities indexes, and HOOVERS securities sectors.

10. A computer-readable storage medium according to claim 1, wherein the portion of the loss that is reimbursed begins at the loss threshold.

11. A computer-readable storage medium according to claim 1, wherein the loss threshold toss is a percentage value.

12. A computer-readable storage medium according to claim 1, wherein the loss threshold is a dollar value.

13. A computer-readable storage medium according to claim 1, wherein the plurality of holders experiencing the largest percentage of loss receive the largest percentage of loss reimbursement.

14. A computer-readable storage medium according to claim 1, wherein the premiums are a percentage of the value of the equity investment instruments at approximately the time that the premiums are aggregated.

15. A computer-readable storage medium according to claim 1, further comprising code to create a pool of a plurality of loss reduction funds.

16. A computer-readable storage medium according to claim 1, wherein reimbursement to the particular holder comes from the pool.

17. A computer-readable storage medium according to claim 1, wherein reimbursement to the particular holder does not come from the pool.

18. A computer-readable storage medium according to claim 1, wherein the predetermined time of one loss reduction fund is not necessarily the same as the predetermined time of another loss reduction fund.

19. A computer-readable storage medium according to claim 1, wherein reimbursement to the particular holder considers both losses correlated to the loss reduction fund of the particular holder, and losses correlated to the other loss reduction funds in the plurality of funds.

20. A computer-readable storage medium according to claim 1, further comprising code to allocate risk through risk capital allocation.

21. A computer-readable storage medium according to claim 1, further comprising code to redistribute redistributes profit.

22. A computer-readable storage medium having computer executable software code stored thereon, the code for creating a loss reduction fund, the code comprising:
   code to define an investment category for the fund; code to associate a plurality of at least three equity investment instruments with the investment category, wherein the at least three equity investment instruments are diverse with respect to each other forming a diverse set of equity investment instruments reflecting different and diverse industry_sectors or industry subsectors, further wherein investment performance of each of the at least three equity investment instruments is not closely correlated because the at least three equity investment instruments reflect different and diverse industry sectors or industry subsectors;
   code to calculate premiums for each equity investment instrument, the premiums held by the fund and at least partially used to reimburse losses by holders of the at least three equity investment instruments; and
   code to determine a loss threshold, wherein losses less than the loss threshold incurred by holders of the at least three equity investment instruments that incurred a loss are not reimbursed and at least a portion of the losses greater than the loss threshold incurred by holders of the at least three equity investment instruments that incurred a loss are reimbursed, wherein reimbursement of losses by holders of the at least three equity investment instruments is according to the loss threshold and either depletes the loss reduction fund or all losses by holders of the at least three equity investment instruments are reimbursed from the loss reduction fund.

23. A computer-readable storage medium according to claim 22, further comprising code to create a pool of a plurality of loss reduction funds.

24. A computer-readable storage medium according to claim 23, wherein a fund in the pool of loss reduction funds includes investment instruments within the same or related investment categories.

25. A computer-readable storage medium according to claim 23, wherein the funds in the pool of loss reduction funds have different reimbursement terms.

26. A computer-readable storage medium having computer executable software code stored thereon, the code for allocating funds from a loss reduction fund to holders of equity investment instruments, the code comprising:
   code to determine respective losses of at least three equity a plurality of investment instruments, wherein the at least three equity investment instruments are diverse with respect to each other forming a diversified set of equity investment instruments reflecting different and diverse industry sectors or industry_subsectors, further wherein investment performance of each of the at least three equity investment instruments is not closely correlated because the at least three equity investment instruments reflect different and diverse industry sectors or industry subsectors;
   code to determine funds available in the loss reduction fund;
   code to calculate a loss threshold, wherein losses less than the loss threshold incurred by holders of the at least three equity investment instruments that incurred a loss are not reimbursed and at least a portion of the losses greater than the loss threshold incurred by holders of the at least three equity investment instruments that incurred a loss are reimbursed; and
   code to allocate funds from the loss reduction fund to the holders of the at least three equity investment instruments according to the loss threshold, wherein allocation either depletes the loss reduction fund or all losses by holders of the at least three equity investment instruments are reimbursed from the loss reduction fund.

27. A computer-readable storage medium according to claim 26, wherein code to determine a loss threshold further comprises:
   code to calculate a loss reimbursement percentage by dividing funds available by the total of the respective losses; and
   code to set the loss threshold according to the loss reimbursement percentage.

28. A computer-readable storage medium according to claim 26, wherein code to determine a loss threshold further comprises:
   code to calculate calculating a loss reimbursement percentage that will compensate losses greater than the loss reimbursement percentage; and
   code to the loss threshold according to the loss reimbursement percentage.

29. A computer-readable storage medium according to claim 26, further comprising code to allocate allocating risk through risk capital allocation.

30. A computer-readable storage medium according to claim 26, further comprising code to redistribute profit.

* * * * *